(12) United States Patent
Ward et al.

(10) Patent No.: US 8,110,883 B2
(45) Date of Patent: Feb. 7, 2012

(54) ELECTROMAGNETIC AND THERMAL SENSORS USING CARBON NANOTUBES AND METHODS OF MAKING SAME

(75) Inventors: Jonathan W. Ward, Fairfax, VA (US); Elwood James Egerton, Manassas, VA (US); Rahul Sen, Lexington, MA (US); Brent M. Segal, Woburn, MA (US)

(73) Assignee: Nantero Inc., Woburn, MA (US)

( * ) Notice: Subject to any disclaimer, the term of this patent is extended or adjusted under 35 U.S.C. 154(b) by 409 days.

(21) Appl. No.: 12/046,855

(22) Filed: Mar. 12, 2008

(65) Prior Publication Data

US 2008/0251723 A1 Oct. 16, 2008

Related U.S. Application Data

(60) Provisional application No. 60/906,409, filed on Mar. 12, 2007.

(51) Int. Cl.
*H01L 31/00* (2006.01)
(52) U.S. Cl. .......... 257/428; 257/467; 257/E31.053
(58) Field of Classification Search .......... 257/428, 257/467, E31.053
See application file for complete search history.

(56) References Cited

U.S. PATENT DOCUMENTS

| | | | |
|---|---|---|---|
| 4,574,263 A | 3/1986 | Liddiard | |
| 5,450,053 A | 9/1995 | Wood | |
| 5,972,108 A | 10/1999 | Beratan et al. | |
| 6,057,637 A | 5/2000 | Zettl et al. | |
| 6,277,318 B1 | 8/2001 | Bower et al. | |
| 6,342,276 B1 | 1/2002 | You et al. | |
| 6,399,177 B1 | 6/2002 | Fonash et al. | |
| 6,409,567 B1 | 6/2002 | Amey, Jr. et al. | |
| 6,422,450 B1 | 7/2002 | Zhou et al. | |
| 6,423,583 B1 | 7/2002 | Avouris et al. | |
| 6,495,116 B1 | 12/2002 | Herman | |
| 6,495,258 B1 | 12/2002 | Chen et al. | |
| 6,515,339 B2 | 2/2003 | Shin et al. | |
| 6,528,020 B1 | 3/2003 | Dai et al. | |
| 6,630,772 B1 | 10/2003 | Bower et al. | |

(Continued)

FOREIGN PATENT DOCUMENTS

GB 2 364 933 A 2/2002

(Continued)

OTHER PUBLICATIONS

Ago et al., "Workfunction of Purified and Oxidised Carbon Nanotubes," Synthetic Metals, vol. 103, pp. 2494-2495 (1999).

(Continued)

*Primary Examiner* — Allan R Wilson

(57) ABSTRACT

Electromagnetic radiation detecting and sensing systems using carbon nanotube fabrics and methods of making the same are provided. In certain embodiments of the invention, an electromagnetic radiation detector includes a substrate, a nanotube fabric disposed on the substrate, the nanotube fabric comprising a non-woven network of nanotubes, and first and second conductive terminals, each in electrical communication with the nanotube fabric, the first and second conductive terminals disposed in space relation to one another. Nanotube fabrics may be tuned to be sensitive to a predetermined range of electromagnetic radiation such that exposure to the electromagnetic radiation induces a change in impedance between the first and second conductive terminals. The detectors include microbolometers, themistors and resistive thermal sensors, each constructed with nanotube fabric. Nanotube fabric detector arrays may be formed for broad-range electromagnetic radiation detecting. Methods for making nanotube fabric detectors, arrays, microbolometers, thermistors and resistive thermal sensors are each described.

14 Claims, 24 Drawing Sheets

U.S. PATENT DOCUMENTS

| | | | |
|---|---|---|---|
| 6,645,628 B2 | 11/2003 | Shiffler, Jr. et al. | |
| 6,706,402 B2 | 3/2004 | Rueckes et al. | |
| 6,706,566 B2 | 3/2004 | Avouris et al. | |
| 6,707,098 B2 | 3/2004 | Hofmann et al. | |
| 6,808,746 B1 | 10/2004 | Dai et al. | |
| 6,833,558 B2 | 12/2004 | Lee et al. | |
| 6,858,197 B1 | 2/2005 | Delzeit | |
| 6,863,942 B2 | 3/2005 | Ren et al. | |
| 6,884,734 B2 | 4/2005 | Buehrer et al. | |
| 6,888,773 B2 | 5/2005 | Morimoto | |
| 6,890,780 B2 | 5/2005 | Lee | |
| 6,894,359 B2 | 5/2005 | Bradley et al. | |
| 6,899,945 B2 | 5/2005 | Smalley et al. | |
| 6,905,892 B2 | 6/2005 | Esmark et al. | |
| 6,911,682 B2 | 6/2005 | Rueckes et al. | |
| 6,918,284 B2 | 7/2005 | Snow et al. | |
| 6,919,592 B2 | 7/2005 | Segal et al. | |
| 6,919,740 B2 | 7/2005 | Snider | |
| 6,921,575 B2 | 7/2005 | Horiuchi et al. | |
| 6,924,538 B2 | 8/2005 | Jaiprakash et al. | |
| 6,946,410 B2 | 9/2005 | French et al. | |
| 6,968,486 B2 | 11/2005 | Matsushima | |
| 6,969,651 B1 | 11/2005 | Lu et al. | |
| 6,982,903 B2 | 1/2006 | Bertin et al. | |
| 6,986,962 B2 | 1/2006 | Oyanagi et al. | |
| 6,990,009 B2 | 1/2006 | Bertin et al. | |
| 6,995,649 B2 | 2/2006 | Nugent | |
| 7,015,500 B2 | 3/2006 | Choi et al. | |
| 7,057,402 B2 | 6/2006 | Cole et al. | |
| 7,161,403 B2 | 1/2007 | Bertin | |
| 7,323,730 B2 * | 1/2008 | Borghetti et al. | 257/290 |
| 7,479,654 B2 * | 1/2009 | Bertin et al. | 257/40 |
| 7,566,478 B2 | 7/2009 | Ward et al. | |
| 7,586,166 B2 * | 9/2009 | Bonnell et al. | 257/428 |
| 7,781,862 B2 | 8/2010 | Bertin et al. | |
| 7,835,170 B2 | 11/2010 | Bertin et al. | |
| 2001/0004979 A1 | 6/2001 | Han et al. | |
| 2002/0160111 A1 | 10/2002 | Sun et al. | |
| 2002/0175390 A1 | 11/2002 | Goldstein et al. | |
| 2003/0004058 A1 | 1/2003 | Li et al. | |
| 2003/0122111 A1 | 7/2003 | Glatkowski | |
| 2003/0177450 A1 | 9/2003 | Nugent | |
| 2003/0200521 A1 | 10/2003 | DeHon et al. | |
| 2004/0005723 A1 | 1/2004 | Empedocles et al. | |
| 2004/0007528 A1 | 1/2004 | Bakajin et al. | |
| 2004/0023253 A1 | 2/2004 | Kunwar et al. | |
| 2004/0031975 A1 | 2/2004 | Kern et al. | |
| 2004/0041154 A1 | 3/2004 | Watanabe et al. | |
| 2004/0043527 A1 | 3/2004 | Bradley et al. | |
| 2004/0071949 A1 | 4/2004 | Glatkowski et al. | |
| 2004/0099438 A1 | 5/2004 | Arthur et al. | |
| 2004/0104129 A1 | 6/2004 | Gu et al. | |
| 2004/0119127 A1 * | 6/2004 | Anazawa et al. | 257/428 |
| 2004/0132070 A1 | 7/2004 | Star et al. | |
| 2004/0181630 A1 | 9/2004 | Jaiprakash et al. | |
| 2004/0253167 A1 | 12/2004 | Silva et al. | |
| 2004/0265550 A1 | 12/2004 | Glatkowski et al. | |
| 2004/0266106 A1 | 12/2004 | Lee | |
| 2005/0052894 A1 * | 3/2005 | Segal et al. | 365/129 |
| 2005/0053525 A1 | 3/2005 | Segal et al. | |
| 2005/0095938 A1 | 5/2005 | Rosenberger et al. | |
| 2005/0134296 A1 * | 6/2005 | Cole et al. | 324/715 |
| 2005/0212014 A1 | 9/2005 | Horibe et al. | |
| 2005/0254547 A1 | 11/2005 | Zribi et al. | |
| 2006/0060785 A1 | 3/2006 | Tinnes | |
| 2006/0076048 A1 | 4/2006 | Gaudiana et al. | |
| 2006/0237857 A1 * | 10/2006 | Bertin et al. | 257/903 |
| 2006/0250843 A1 | 11/2006 | Bertin et al. | |
| 2006/0250856 A1 | 11/2006 | Bertin et al. | |
| 2006/0258122 A1 | 11/2006 | Whitefield et al. | |
| 2006/0264053 A1 | 11/2006 | Yates | |
| 2006/0276056 A1 | 12/2006 | Ward et al. | |
| 2006/0281256 A1 | 12/2006 | Carter et al. | |
| 2006/0281287 A1 | 12/2006 | Yates et al. | |
| 2006/0292716 A1 | 12/2006 | Gu et al. | |
| 2007/0004191 A1 | 1/2007 | Gu et al. | |
| 2008/0012047 A1 | 1/2008 | Bertin | |
| 2008/0142850 A1 | 6/2008 | Bertin | |
| 2008/0157126 A1 | 7/2008 | Bertin | |
| 2008/0159042 A1 | 7/2008 | Bertin | |
| 2008/0170982 A1 * | 7/2008 | Zhang et al. | 423/447.3 |
| 2009/0115305 A1 * | 5/2009 | Segal et al. | 313/300 |
| 2009/0121136 A1 * | 5/2009 | Gruss et al. | 250/336.1 |
| 2009/0140167 A1 * | 6/2009 | Ward et al. | 250/458.1 |

FOREIGN PATENT DOCUMENTS

| | | |
|---|---|---|
| JP | 2000/203821 | 7/2000 |
| JP | 2001/035362 | 2/2001 |
| JP | 2004/090208 | 3/2004 |
| WO | WO-98/39250 A1 | 9/1998 |
| WO | WO-99/65821 A1 | 12/1999 |
| WO | WO-01/03208 A1 | 1/2001 |
| WO | WO-00/245113 A2 | 6/2002 |
| WO | WO-00/248701 A2 | 6/2002 |
| WO | WO-03/016901 A1 | 2/2003 |
| WO | WO-03/034142 A1 | 4/2003 |
| WO | WO-2006/132658 A2 | 12/2006 |
| WO | WO-2008/112764 | 9/2008 |

OTHER PUBLICATIONS

Ajayan, P. M. et al., "Applications of Carbon Nanotubes", Carbon Nanotubes, vol. 80, pp. 391-425, 2001.

Avouris, P., et al., "Carbon Nanotube Electronics," Chemical Physics, 2002, vol. 284, pp. 429-445.

Banerjee et al., "Functionalization of Carbon Nanotubes with a Metal-Containing Molecular Complex," Nano Letters, vol. 2, No. 1, pp. 49-53, Nov. 1, 2002.

Berhan, L. et al., "Mechanical properties of nanotube sheets: Alterations in joint morphology and achievable moduli in manufacturable materials", Journal of Applied Physics, vol. 95, No. 8, pp. 4335-4345, Apr. 15, 2004.

Bonard, J. M. et al., "Monodisperse Multiwall Carbon Nanotubes Obtained with Ferritin as Catalyst", Nano Letters, vol. 2, No. 6, pp. 665-667, May 9, 2002.

Cassell, A. M. et al., "Large Scale CVD Synthesis of Single-Walled Carbon Nanotubes", J. Phys. Chem. B, pp. 6484-6492, Jul. 20, 1999.

Chen, B. et al., "Heterogeneous Single-Walled Carbon Nanotbue Catalyst Discovery and Optimization", Chem. Mater., vol. 14, pp. 1891-1896, Mar. 12, 2002.

Cheng, H M., "Large-scale and low-cost synthesis of single-walled carbon nanotubes by the catalytic pyrolysis of hydrocarbons", Applied Physics Letters, vol. 72, No. 25, pp. 3282-3284, Jun. 22, 1998.

Chiang, et al., Purification and Characterization of Single-Wall Carbon Nanotubes (SWNTs) Obtained from the Gas-Phase Decomposition of CO (HiPco Process), J. Phys. Chem. B, vol. 105, pp. 8297-8301, Jan. 12, 2001.

Collins, et al., Engineering Carbon Nanotubes and Nanotube Circuits Using Electrical Breakdown, Science, vol. 292, pp. 706-709, Apr. 2001.

Cui, J.B. et al., "Carbon Nanotube Memory Devices of High Charge Storage Stability," Applied Physics Letters, 2002. 81 (17) 3260-3262. cited by other.

Dai, H. et al., "Controlled Chemical Routes to Nanotube Artchitectures, Physics, and Devices", J. Phys. Chem. B, vol. 103, pp. 1126-11255, Dec. 7, 1999.

Delzeit et al., "Multilayered metal catalysts for controlling the density of single-walled carbon nanotubes growth," Chemical Physics letters, vol. 348, pp. 368-374, Nov. 16, 2001.

Derycke, V. et al. "Carbon Nanotube Inter-and Intramolecular Logic Gates." Nano Letters, vol. 1, pp. 453-456, Sep. 2001.

Desai et al., "Freestanding Carbon Nanotube Specific Fabrication", *Proc. of 2005, 5th IEEE Conf., Nanotech*, Nagoya, Japan, pp. 1-4, Jul. 2005.

Franklin, N. R. et al., "An Enhanced CVD Approach to Extensive Nanotube Networks with Directionality", Advanced Materials, 5 pages, 2000.

Fuhrer, M.S., et al. "High-Mobility Nanotube Transistor Memory," *Nano Letters*, 2002, vol. 2, No. 7, pp. 755-759, May 30.

Haddon et al.,"Purification and Separation of Carbon Nanotubes," *MRS Bulletin*, , pp. 252-259, Apr. 2004.

Hafner, J. H. et al., "Catalytic growth of single-wall carbon nanotubes from metal particles", Chemical Physics Letters, vol. 296, pp. 195-202, Oct. 30, 1998.

Homma, Y. et al., "Single Walled Carbon Nanotube Growth on Silicon Substrates Using Nanoparticle Catalysts", Jpn. J. Appl. Phys., vol,. 41, Pt. 2, No. 1A/B, pp. L89-L91, 2002.

Hone, J., "Phonons and Thermal Properties of Carbon Nanotubes", *Carbon Nanotubes, Topics Appl. Phys.*, vol. 80, pp. 273-286, 2001.

International Search Authority, International Search Report for PCT/US2005/045316 mailed Sep. 6, 2006, 2 pages.

International Search Report and Written Opinion for International Patent Application PCT/US05/18467, mailed Oct. 1, 2007.

International Search Report, International Searching Authority, for International Application PCT/US05/18539, mailed Sep. 18, 2006, 4 pages.

Itkis, et al., "Bolometric Infrared Photoresponse of Suspended Single-Walled Carbon Nanotube Films," Science, vol. 312, pp. 413-417, 2006.

Jeong et al., "A new purification method of single-wall carbon nanotubes using H2S and O2 mixture gas," Chemical Physics Letters, vol. 344, pp. 18-22, Aug. 17, 2001.

Johnson, R. Colin, "IBM fellow unrolls blueprint for nano", *EETimes*, Mar. 6, 2006, 3 pages, http://www.eetimes.com/showArticle.jhtml?articleID=181500304.

Joselevich, E., "Vectorial Growth of Metallic and Semiconducting Single-Wall Carbon Nanotubes", Nano Letters, vol. 0, No. 0, A-E, 2002.

Khan et al, "Solubilization of Oxidized Single-Walled Carbon Nanotubes in Organic and aqueous Solvent through Organic Derivation," Nano Letters, vol. 2, No. 11, pp. 1215-1218, Oct. 2, 2002.

Kong, J. et al., "Chemical vapor deposition of methane for single-walled carbon nanotubes", Chemical Physics Letters, pp. 567-574, Aug. 14, 1998.

Kong, J. et al., "Nanotube Molecular Wires as Chemical Sensors," Science, 2000, vol. 287 pp. 622-625.

Kong, J. et al., "Quantum Interference and Ballistic Transmission in Nanotube Electron Waveguides", *The American Physical Society*, vol. 87, No. 10, pp. 106801-1-106801-4, Sep. 3, 2001.

Langer, L. et al., "Electrical Resistance of a Carbon Nanotube Bundle," J. Mater. Res. vol. 9, No. 4, Apr. 1994, 6 pages.

Li, J. et al., "Carbon Nanotube Nanoelectrode Array for Ultrasensitive DNA Detection", Nano Letters, vol. 3, No. 5, pp. 597-602, 2003.

Li, Y. et al., "Growth of Single-Walled Carbon Nanotubes from Discrete Catalytic Nanoparticles of Various Sizes", J. Phys. Chem. B, vol. 105, pp. 11424-11431, 2001.

Li, Y. et al., "Preparation of Monodispersed Fe-Mo Nanoparticles as the Catalyst for CVD Synthesis of Carbon Nanotubes", Chem. Mater., vol. 13. pp. 1008-1014, 2001.

Nerushev, O. A., et al., "Carbon nanotube films obtained by thermal chemical vapour deposition", J. Mater. Chem., vol. 11, pp. 1122-1132, 2001.

Niu, Chunming et al., "High Power Electrochemical Capacitors Based on Carbon Nanotube Electrodes," Appl. Phys. Lett. 70(11), Mar. 17, 1997, pp. 1480-1482.

Novak, J.P. et al., "Nerve agent detection using networks of single-walled carbon nanotubes," Applied Physics Letters, Volumber 83, No. 19, Nov. 10, 2003, pp. 4026-4028.

Onoa et al., "Bulk Production of singly dispersed carbon nanotubes with prescriped lengths", *Nanotechnology*, vol. 16, pp. 2799-2803, 2005.

Parikh, K. et al., "Flexible vapour sensors using single walled carbon nanotubes", Sensors and Actuators B, vol. 113, pp. 55-63, 2006.

Peigney, M. et al., "A Study of the Formation of Single- and Double-Walled Carbon Nanotubes by a CVD Method", J. Phys. Chem. B., vol. 105, pp. 9699-9710, 2001.

Qi, P. et al., "Toward Large Arrays of Multiplex Functionalization Carbon Nanotube Sensors for Highly Sensitive and Selective Molecular Detection," *Nano Lett.* 2003, vol. 3(3), pp. 347-351.

Rueckes, et al., "Carbon nanotube-based nonvolatile random access memory for molecular computing", *Science*, vol. 289, pp. 94-97, Jul. 7, 2000.

Shelimov et al., "Purification of single-wall carbon nanotubes by ultrasonically assisted filtration," Chemical Physics Letters, vol. 282, pp. 429-434, Jan. 23, 1998.

Snow, E.S. et al., "Random networks of carbon nanotubes as an electronic material," Applied Physics Letters, vol. 82, No. 13, Mar. 31, 2003, pp. 2145-2147.

Sotiropoulou, S. et al., "Carbon nanotube array-based biosensor", Anal. Bioanal. Chem, vol. 375, pp. 103-105, Oct. 31, 2002.

Star, A. et al., "Nanoelectronic Carbon Dioxide Sensors," Adv. Mater. 2004, 16, No. 22, Nov. 18, pp. 2049-2052.

Star, A. et al., "Nanotube Optoelectronic Memory Devices," Nano Letters, 2004, vol. 4, No. 9, pp. 1587-1591.

Valentini, L. et al., "Sensors for Sub-ppm $NO_2$ Gas Detection Based on Carbon Nanotube Thin Films," *Applied Physics Letters*, 2003, vol. 82(6), pp. 961-963.

Zhang et al., "Formation of metal nanowires on suspended signel-walled carbon nanotubes", *Appl. Phys. Lett.*, vol. 77, p. 3015, Nov. 2000.

Zhang, Y. et al., "Metal coating on suspended carbon Nanotubes and its implication to metal-tube interaction", Chemical Physics Letters, vol. 331, pp. 35-41, Nov. 24, 2000.

Zhang, Z. et al.,"Select Pathways to Carbon Nanotube Film Growth", Advanced Materials, 4 pages, Jun. 19, 2001.

Zhao, Y. P. et al., Frequency-dependent electrical transport in carbon nanotubes, Physical Review B., vol. 64, pp. 201402-1 to 201402-4, Oct. 22, 2001.

Zhou, Y. et al., "p-Channel, n-Channel Thin Film Transistors and p-n Diodes Based on Single Wall Carbon Nanotube Networks," Nano Letters, 2004, vol. 4, No. 10, pp. 2031-2035.

International Search Report and Written Opinion of the International Searching Authority, the United States Patent and Trademark Office, for International Application No. PCT/US2008/056664, mailing date of Jul. 28, 2008, 10 pages.

Awano, Y., "Graphene for VLSI: FET and Interconnect Applications" IEDM 2009 Technical Digest, pp. 10.1.1-10.1.4.

Brown, K.M. "System in package "The Rebirth of SIP"," 2004 IEEE Custom Integrated Circuits Conference, May 2004, 6 pages.

Crowley, M. et al., "512 Mb PROM with 8 layers of antifuse/Diode cells," IEEE International Solid-State Circuits Conference, vol. XLVI, Feb. 2003, 24 pages.

Huai, Y. "Spin-Transfet Torque MRAM (STT-MTAM): Challenges and Prospects". AAPS Bulletin Dec. 2008, vol. 18, No. 6, pp. 33-40.

Jiang, Y. et al., "Performance Breakthrough in 8nm Gate-All-Around Length Gate-All-Around Nanowire Transistors using Metallic Nanowire Contacts" 2008 Symposium on VLSI Technology Digest of Technical Papers, pp. 34-35.

Kianian, S. et al., "A 3D Stackable Carbon Nanotube-based Nonvolatile Memory (NRAM)," ESSDERC, Jun. 14, 2010, Nantero, Inc., 4 pages.

Servalli, G. "A 45nm Generation Phase Change Memory Technology," IEDM 2009 Technical Digest, pp. 5.7.1-5.7.4.

\* cited by examiner

ELECTROMAGNETIC AND THERMAL SENSORS USING CARBON NANOTUBES AND METHODS OF MAKING SAME

CROSS-REFERENCE TO RELATED APPLICATIONS

This application claims priority under 35 U.S.C. §119(e) to U.S. Provisional Patent Application No. 60/906,409, filed on Mar. 12, 2007, entitled "Electromagnetic Thermal Sensors Using Carbon Nanotubes and Methods of Making Same," which is incorporated herein by reference in its entirety.

BACKGROUND

1. Technical Field

The present application relates generally to nanotube fabrics and methods of making same and, more specifically to carbon nanotube fabrics and methods of making same for use in electromagnetic radiation detecting and sensing systems.

2. Discussion of Related Art

Detectors are an integral part of optical circuits and components (emitters, modulators, repeaters, waveguides or fibers, reflectors, resonators, etc.) and are used for the sensing of electromagnetic (EM) radiation. Photoconducting materials, typically semiconductors, have electrical properties that vary when exposed to EM radiation (i.e. UV, visible and IR). One type of photoconductivity arises from the generation of mobile carriers (electrons or holes) during absorption of photons. For semiconducting materials, the absorption of a specific wavelength of light, hence photon energy, is directly proportional to the band gap of the material ($E_g = h\nu = hc/\lambda$, where $E_g$ is the materials band gap, h is Plank's constant ($4.136 \times 10^{-15}$ eVs), c is the speed of light in a vacuum ($2.998 \times 10^{10}$ cm/s) and $\lambda$ is the wavelength of the radiation). If the band gap energy is measured in eV (electron Volts) and the wavelength in micrometers, the above equation reduces to $E_g = 1.24/\lambda$. A photodiode (i.e. p-n diode, p-i-n photodiode, avalanche photodiode, etc.) is the most commonly employed type of photoconductor as described in Kwok K. N G, "Complete Guide to Semiconductor Devices," IEEE Press, John Wiley & Sons, 2002, pages 431-437. Light detection is ideally suited for direct band gap semiconductors such as Ge, GaAs, etc.; however, indirect band gap semiconductors (where an additional phonon energy is required to excite an electron from the valence band to the conduction band, making these detectors less efficient), such as Silicon, are also used as photodetectors. Probably the most widely known type of photodetctor is the solar cell, which uses a simple p-n diode or Schottky barrier to detect impinging photons. Besides silicon, most photodetectors do not integrate with current microelectronics technology, usually detect only a specific wavelength (i.e. 1.1 $\mu$m for Si, 0.87 $\mu$m for GaAs, 0.414 $\mu$m for $\alpha$-SiC and 1.89 $\mu$m for Ge), and require multiple detectors to detect a broad band of wavelengths (hence photon energy).

There are several other techniques that can be employed to detect EM: by a change in resistance induced from a temperature rise in a detecting medium (bolometers), as described in Kwok K. N G, "Complete Guide to Semiconductor Devices," IEEE Press, John Wiley & Sons, 2002, pages 532-533, or changes in a materials internal dipole moment when impinging radiation causes a temperature rise (pyroelectric detector). Bolometers can be constructed from either metallic, metallic-oxides or semiconducting materials. Since bolometers detect a broad range of radiation above a few microns, bolometers are typically cryogenically cooled to reduce the detection of blackbody radiation that is emitted from the detector material, which leads to a high background noise.

Detectors are critical for communication and EM sensing applications, specifically in the infrared (IR) spectrum, $\lambda > 0.75$ $\mu$m. Currently, many IR sensors are expensive, require advanced fabrication techniques that are not compatible with Si—CMOS technology, have limited resolution and do not operate at room temperature (hence require cooling). Conventional IR detectors mainly employ bolometers, more specifically microbolometers.

IR Focal Plane Arrays (IRFPAs), which operate in the 8-12 micron band, have experienced a revolution since the introduction of vanadium dioxide (VOx) microbolometer arrays. Until that time, tactical and strategic applications had relied upon HgCdTe IRFPAs, which operated at 77 K and necessitated the use of mechanical coolers. The HgCdTe system was plagued by defects, high processing costs, low yields and substantial weight (eliminating crucial man-portable applications). The introduction of VOx, serving as the TCR (Temperature Coefficient of Resistance) IR radiation sensing layer that is deposited on a thermally isolated cantilever beam, based microbolometers overcame many of the issues associated with HgCdTe. VOx technology can be fabricated with CMOS design and process technologies on silicon wafers, with a lower built in unit product cost. VOx devices also do not require cooling to 77 K—only thermal stabilization. This technology also enabled the introduction of man portable IR systems such as Thermal Weapon Sight and helmet integrated visible/Long-Wave IR (8-12 $\mu$m) fused imagery, which would not have been possible with cooled HgCdTe.

A major advantage of VOx technology is its CMOS compatibility. CMOS technology provides improved performance and increased resolution. Advanced CMOS processing techniques also enables the development of a reflective cavity coating that allows IR energy to reflect off the bottom of a cavity and to be absorbed by the VOx layer, increasing the efficiency of IR adsorption. Because of advanced CMOS process development and integration, detector unit cells have shrunk and the fill factors have increased, resulting in 640×480 pixel IRFPAs, thereby increasing the resolution of the cameras that these IRFPA are deployed in. The resolution of the IRFPA is directly related to the CMOS technology node and the minimum pixel size of the bolometer. For VOx microbolometers, increasingly higher resolution IRFPAs are not possible because of limits associated with the TCR of VOx: below 25 microns (required for 640×480 resolution), the TCR of VOx becomes non-linear. Additionally, improvements in analog preamp designs in CMOS have increased the signal to noise ratio for un-cooled IRFPAs.

Despite the improvements VOx has contributed to microbolometers, there is evidence that the improvement curve for this material is slowing down and some fundamental limits are preventing the use of these arrays in modern IR systems. First, there is a lack of responsivity in the vital Mid-Wave IR (MWIR) band (3-5 $\mu$m). A second limitation is that for UV applications, such as threat warning of missiles, VOx technology is not able to detect UV signatures from missile plumes. Although thermal isolation has improved to the levels of 20 mK, further improvements are required; therefore, another limitation of VOx based IRFPAs is that the performance Noise Equivalent Temperature Difference (NETD) is saturating, related to the limits of VOx absorption. The need for multi color (MW/LWIR) systems in tactical and strategic systems is also a necessity, which is not possible with VOx based microbolometers. Another issue with VOx is the inability to scale below 25 micron pixel sizes, limiting detectors to 640×480 pixels. As stated above, below 25 microns, the TCR of VOx becomes non-linear. Additionally, the 1/f noise of VOx increases as the pixel dimension decreases.

Carbon nanotubes (CNTs) are a promising material for electromagnetic (EM) detection and have recently been investigated for their unique optical properties, focusing on the emission and detection of IR radiation (see Sheng, et al., "Exciton dynamics in single-walled nanotubes: Transient photoinduced dichroism and polarized emission," Physical Review B, 71 (2005), 125427, Perebeinos, et al., "Scaling of Excitons in Carbon Nanotubes," Physical Review Letters, 92 (2004), 257402, Ugawa, et al., "Far-infrared to visible optical conductivity of single-wall carbon nanotubes," Current Applied Physics, 1 (2001) 485-491, Lehman, et al., "Single-wall carbon nanotube coating on a pyroelectric detector," Applied Optics, 44 (2005), 483-488, Itkis, et al., "Bolometric infrared photoresponse of suspended single-walled carbon nanotube film," Science, 312 (2006), 413-416 and Mohite, et al., "Displacement current detection of photoconduction in carbon nanotubes," Applied Physics Letters, 86 (2005), 061114).

Typical band-gaps for carbon nanotubes range from 0.6-1.2 eV, depending on the diameter of the CNT, where the band gap is inversely proportional to the diameter of the nanotube, which correlates to detection and emission of radiation in the IR spectrum. Several approaches to CNT light emission and detection have been investigated, namely the generation of excitons to produce a photocurrent or the generation of heat which changes the resistance of nanotube material (bolometer). Photoluminescence and photo-detection studies have demonstrated that carbon nanotubes, specifically single-walled nanotubes (SWNTs), absorb radiation at between 0.6-2 eV, correlating to the transition between van Hove peaks of the nanotubes (S11, S22 and M11). Carbon nanotubes have also demonstrated extremely high absorption coefficients of the order of $10^4$-$10^5$ cm$^{-1}$, higher than HgCdTe and much higher than VOx. Combining these properties allows for CNTs as a possible candidate for replacing HgCdTe and VOx for resistive microbolometer material.

A paper by Itkis demonstrated the creation a non-CMOS compatible CNT bolometer using a thick suspended mat of as-deposited, arc-grown SWNTs. Using a 0.94 □m emitting IR laser at 12 □W, the mat of CNTs demonstrated a sizable decrease in conductivity of the CNT mat with an S/N ratio of 100. TCR values measured by Itkis are comparable to vanadium dioxide, which strongly suggests the ability of the CNT bolometer to operate at room temperature. It was also noted that a decrease in mat thickness improves the sensitivity of the CNT bolometer; however, their fabrication technique can not produce reliable thickness and is not scalable to monolayered fabrics.

Despite the work performed by these groups there are still many concerns that need to be addressed before a reliable CNT-IR sensor becomes a reality. The first concern necessitates the need for processes that can be employed to fabricate the CNT-IR sensors with CMOS compatible technology and incorporated within silicon electronic devices. A possible disadvantage with CNTs is their varying band gaps; therefore, a functionalization scheme may need to be developed that produces CNTs with repeatable properties.

SUMMARY

The present application relates generally to nanotube fabrics and methods of making same and, more specifically to carbon nanotube fabrics and methods of making same for use in electromagnetic radiation detecting and sensing systems.

Under certain embodiments of the invention, electromagnetic and thermal sensors and detectors using carbon nanotube fabrics are provided. Under other aspects of the invention, microbolometers using carbon nanotubes and carbon nanotube fabrics are used to detect UV and IR radiation.

According to one embodiment of the invention, an electromagnetic radiation detector includes a substrate, a nanotube fabric disposed on the substrate, the nanotube fabric comprising a non-woven network of nanotubes, and first and second conductive terminals, each in electrical communication with the nanotube fabric, the first and second conductive terminals disposed in space relation to one another. The nanotube fabric may be tuned to be sensitive to a predetermined range of electromagnetic radiation such that exposure to the electromagnetic radiation induces a change in impedance between the first and second conductive terminals.

Under another aspect of the invention, the detector further includes sensing circuitry for detecting the change in input impedance, the sensing circuitry integrated with CMOS circuitry.

Under another aspect of the invention, the nanotube fabric is functionalized to be sensitive to the predetermined range of electromagnetic radiation.

Under another aspect of the invention, the nanotube fabric is derivatized to be sensitive to the predetermined range of electromagnetic radiation.

Under another aspect of the invention, the substrate comprises a dielectric material.

Under another aspect of the invention, a predetermined range of electromagnetic radiation includes IR radiation and the active region of the nanotube fabric has a thermal coefficient of resistance between approximately 1% per degree C. and approximately 4% per degree C.

Under another aspect of the invention, the electromagnetic radiation comprises UV radiation.

Under another aspect of the invention, the nanotube fabric comprises one of a multilayer fabric and a monolayer fabric.

Under another aspect of the invention, the nanotube fabric further comprises semiconducting nanoparticles, the nanotube fabric tuned such that exposure to a selected photon energy induces the change in impedance between the first and second conductive terminals.

Under another aspect of the invention, the nanotube fabric comprises dye-sensitized nanoparticles.

Under another aspect of the invention, the nanotube fabric comprises electromagnetic radiation-sensitive nanoparticles including at least one of VOx, amorphous silicon and Ti particles.

Under another aspect of the invention, the nanotube fabric is disposed on a dielectric layer and the nanotube fabric comprises an active region that is suspended in spaced relation from the substrate.

Under another aspect of the invention, a reflective layer is disposed in spaced relation from the active region of the nanotube fabric and defines a boundary of a cavity, the reflective layer reflecting at least a portion of the electromagnetic radiation such that the reflected electromagnetic radiation is incident on the active region of the nanotube fabric.

Under another aspect of the invention, the predetermined range of electromagnetic radiation comprises thermal radiation and the nanotube fabric is tuned to have a selected thermal coefficient of resistance (TCR).

Under another aspect of the invention, the TCR comprises a positive value.

Under another aspect of the invention, the TCR comprises a negative value.

Under another aspect of the invention, the selected TCR is tuned through one of doping and functionalizing the nanotube fabric.

According to another embodiment of the invention, a microbolometer detector includes a substrate, a conductive electrode, a reflective element having an upper surface substantially disposed below the upper surface of the substrate, the reflective element defining at least one boundary of a cavity in the substrate and a dielectric layer disposed over at least a portion of the cavity and disposed over the conductive electrode. The microbolometer further includes a region of nanotube fabric comprising a non-woven network of nanotubes disposed on the dielectric layer and in electrical communication with the conductive electrode and the region of nanotube fabric is tuned to be sensitive to a predetermined range of electromagnetic radiation such that exposure to the electromagnetic radiation induces in the nanotube fabric electrical stimuli transmitted to the conductive electrode.

Under another aspect of the invention, the nanotube fabric is functionalized with electromagnetic radiation-sensitive particles to induce the electrical stimulus in the nanotube fabric.

Under another aspect of the invention, the dielectric layer includes a material substantially transparent to electromagnetic radiation in the IR range.

Under another aspect of the invention, the dielectric layer includes a doped SiNx material.

Under another aspect of the invention, the dielectric layer comprises a low-stress SiNx material.

Under another aspect of the invention, the detector further includes sensing circuitry for detecting the electrical stimuli transmitted to the conductive electrode, the sensing circuitry integrated with CMOS circuitry.

Under another aspect of the invention, the reflective element substantially reflects electromagnetic radiation such that the nanotube fabric absorbs electromagnetic radiation incident on the detector and reflected electromagnetic radiation.

Under another aspect of the invention, the reflected electromagnetic radiation incident on the nanotube fabric comprises approximately 20% of electromagnetic radiation absorbed by the nanotube fabric.

Under another aspect of the invention, the electromagnetic radiation comprises IR radiation and the nanotube fabric is tuned to have an absorption coefficient of approximately 10E4 cm-1 to approximately 10E5 cm-1.

Under another aspect of the invention, the region of nanotube fabric is tuned to have a sheet resistance of approximately 100 to 10000 ohms per square.

Under another aspect of the invention, the region of nanotube fabric comprises an area between approximately 25 microns square and approximately 2500 microns square.

Under another aspect of the invention, the conductive electrode comprises a Co material.

Under another aspect of the invention, the conductive electrode comprises a Ti material.

Under another aspect of the invention, the microbolometer detector further includes a second conductive electrode in electrical communication with the region of nanotube fabric, the second conductive electrode disposed in spaced relation to the first conductive electrode.

Under another aspect of the invention, the conductive electrode and the second conductive electrode comprise one of a ZnO material, a GaN material, and a Si3N4 material, the conductive electrode and second conductive electrode in electrical communication with CMOS circuitry.

Under another aspect of the invention, the nanotube fabric further comprises semiconducting nanoparticles, the nanotube fabric tuned to be sensitive to a predetermined photon energy.

Under another aspect of the invention, the nanotube fabric further comprises dye-sensitized nanoparticles.

Under another aspect of the invention, the detector is in electrical communication with interconnect circuitry and the nanotube fabric is tuned such that a first impedance value between the first and second conductive terminals matches an impedance of the interconnect circuitry.

According to another embodiment of the invention, a method of making an electromagnetic radiation detector includes providing a substrate, providing a conductive electrode, providing a nanotube fabric comprising a non-woven network of nanotubes, disposed in electrical communication with the conductive electrode and forming a cavity in the substrate such that a portion of the region of nanotube fabric is suspended over the cavity. The method further includes forming a nanotube detector member from the nanotube fabric, the nanotube detector member tuned to be sensitive to a selected range of electromagnetic radiation such that exposure to the electromagnetic radiation induces in the detector member a change in electrical stimuli communicated to the conductive electrode.

Under another aspect of the invention, providing the nanotube fabric includes providing substantially purified nanotubes and forming the nantotube detector member includes patterning the nanotube fabric.

Under another aspect of the invention, forming the nanotube detector member comprises one of functionalizing and derivitizing the nanotube fabric.

Under another aspect of the invention, a reflective element may be formed on a surface of the substrate, the reflective element defining a lower boundary of the cavity.

Under another aspect of the invention, the reflective element includes a material selected to reflect a subset of the electromagnetic radiation.

Under another aspect of the invention, a dielectric layer may be disposed on least a portion of the cavity in the substrate and disposed over the conductive electrode, the dielectric layer interposed between the conductive electrode and the nanotube detector member.

Under another aspect of the invention, forming the cavity in the substrate further comprises providing a sacrificial layer and selectively removing a portion of the substrate.

Under another aspect of the invention, the sacrificial layer includes one of amorphous silicon, aluminum, germanium and thermally decomposing polymer.

Under another aspect of the invention, the region of nanotube fabric includes one of spinning or spray coating carbon nanotubes such that the region of nanotube fabric has a sheet resistance of approximately 100 to 10000 ohms per square.

Under another aspect of the invention, providing the region of nanotube fabric further comprises an annealing process to eliminate at least some metallic nanotubes.

Under another aspect of the invention, a gate electrode in electrical communication with the nanotube fabric may be formed for gating at least some semiconducting nanotubes in the nanotube fabric.

Under another aspect of the invention, the region of nanotube fabric may be tuned to reduce 1/f noise in electrical stimulus communicated to the conductive contact.

Under another aspect of the invention, the substrate, conductive electrode and region of nanotube fabric may be mounted in a partial vacuum package and the partial vacuum package may be back-filled with a selected gas, the selected gas He.

According to another embodiment of the invention, a broad-range electromagnetic radiation detector array on a wafer includes a plurality of detectors. Each detector may have a substrate, a nanotube fabric disposed on the substrate, the nanotube fabric comprising a non-woven network of nanotubes, and first and second conductive terminals, each in electrical communication with the nanotube fabric, the first and second conductive terminals disposed in space relation to one another. Each detector in the array may be tuned to be sensitive to a predetermined subset of a broad-range of electromagnetic radiation such that exposure to the predetermined subset of electromagnetic radiation induces in each detector a change in impedance between the first and second conductive terminals.

Under another aspect of the invention, for a first of the plurality of detectors, the predetermined subset of the broad-range of electromagnetic radiation includes the UV range.

Under another aspect of the invention, for a second of the plurality of detectors, the predetermined subset of the broad-range of electromagnetic radiation includes the IR range.

Under another aspect of the invention, electromagnetic radiation includes thermal radiation and tuning each detector includes tuning the TCR of the nanotube fabric.

Under another aspect of the invention, tuning the TCR of the nanotube fabric includes adjusting the thickness of the layer of nanotubes.

Under certain aspects of the invention, a cavity is fabricated in an oxide after interconnect metals of a CMOS wafer are processed. A thin film dielectric member that is thermally isolated from the surrounding environment may be provided. A nanotube fabric may be placed on the dielectric member having, in certain embodiments, either a positive or negative TCR of approximately 1-2.5%. A sacrificial layer may be used to create a cantilever beam pixel structure. The cantilever beam pixel structure may be connected to conductive contacts which are, in turn, connected to the terminal metallurgy of the CMOS circuits. A sacrificial layer may be used to form a cavity that consists of amorphous silicon, aluminum or thermally decomposing polymer. In certain embodiments, the conductive contacts comprise Si3N4 Legs provide connections to terminal metallurgy of corresponding CMOS wafers for detectors sensitive to at least a portion of IR radiation. In certain embodiments, conductive contacts comprise highly doped ZnO legs provide connections to terminal metallurgy of corresponding CMOS wafers for detectors sensitive to at least a portion of UV radiation.

Under certain aspects of the invention, a carbon nanotube layer comprises semiconducting nanotubes fabricated with an anneal process that substantially eliminates metallic nanotubes. In certain embodiments, a reflective thin film is included to increase the absorption of incident radiation from approximately 70% to 90%.

Under certain aspects of the invention, readout electronic preamplifier circuitry is based upon capacitive trans-impedance input architecture designed in CMOS. The digital readout section may also be designed to readout the rows and columns of two dimensional pixel arrays. The circuitry comprises integrators, sample and hold and column multiplexers.

Under certain aspects of the invention, the detectors are tuned to absorb radiation in the IR bands, especially LWIR (8-12 microns) and MWIR (3-5 microns) and in the UV range. Multicolor focal plane arrays are with near simultaneous readout of detectors are provided. Thermistor sensors using carbon nanotubes are provided under other embodiments. In certain embodiments, microbolometers with carbon nanotube fabrics include thermal stabilization or a thermal reference for calibration. Focal plane arrays can use either a single stage thermoelectric stabilizer or incorporate memory into the electronic design to calibrate each pixel at test. In other embodiments, dye sensitized solar cells using carbon nanotubes are provided.

DETAILED DESCRIPTION

Figure 1A:
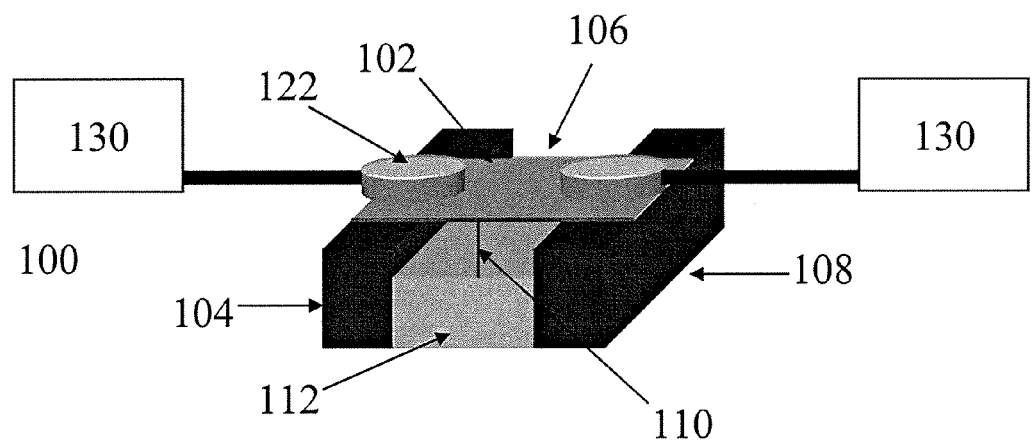
FIG. 1A illustrates a detecting element according to one aspect of the invention with a suspended nanofabric.

Various embodiments of the invention provide carbon nanotube fabrics for use in electromagnetic radiation detecting and sensing systems and methods of making the same.

Broad-range electromagnetic radiation sensors and detectors may be constructed with nanotube fabrics. Carbon nanotubes have unique electrical and thermal properties that make them excellent materials for electromagnetic radiation and, specifically thermal detection. Fabrics constructed from carbon nanotubes have the capability of sensing a wide spectrum of radiation, from Gamma Rays (□<1 Å) to Radio Frequencies (□>0.1 cm). With very low metal contamination levels, nanotube fabrics can be readily deposited on a variety of substrates and can be integrated with CMOS technology. The attributes of carbon nanotubes and carbon nanotube fabrics make them an excellent and high-performance material when used in electromagnetic and thermal detectors. The performance advantages of detectors (e.g. microbolometers) constructed with carbon nanotube fabric are complemented by their versatility in detecting a broad range of the electromagnetic spectrum. Arrays of nanotube fabric detectors may be patterned on a single wafer, each individual detector in the array tuned to be sensitive to a predetermined range of electromagnetic radiation. Tuning the individual detectors may include functionalizing, derivatizing, doping portions of nanotube fabric (or using another suitable method) to sensitize the fabric to a selected range of the electromagnetic radiation spectrum. A broad-range detection array may be constructed to include detectors tuned to be sensitive to the UV range of the spectrum, detectors tuned to be sensitive to the IR range of the spectrum, and detectors tuned to detect intermediate ranges of the spectrum. Because the nanotube fabric detectors are readily fabricated and electrically connected with CMOS integration techniques, it is possible to deposit, pattern and interconnect the nanotube fabric detectors at any device level to measure radiation incident on and temperature fluctuations in an active device.

Currently, detectors used for optical and optoelectronic applications in the semiconductor industry are typically micron-sized or larger structures and are discrete components that can only detect radiation of within a narrow spectrum. There is a need for large scale fabrication of nanosized detectors used for electronic, optical and optoelectronic applications which can be monolithically integrated into a CMOS process flow for integrated circuits. Ideally, these detectors should also have the capability to detect a wide spectrum of radiation from Gamma Rays (□<1 Å) to Radio Frequencies (□>0.1 cm). Such sensing elements have the potential for a broad range of usefulness in most types of consumer electronics where any electromagnetic detection in integrated circuits is beneficial. Solutions to the problems with current EM detectors are provided herein by employing carbon nanotubes, specifically carbon nanotube technology disclosed in the incorporated Nantero references.

While not wishing to be bound by theory, the inventors envision several possible techniques that can be used for the detection of EM radiation in systems comprising nanotube fabrics. These techniques include: generation of a photocurrent by electron-hole recombination, generation of heat which will produce a resistance change in the fabric, generation of phonons by the photo-acoustic effect, as described in Ajayan, et al., "Nanotubes in a Flash-Ignition and Reconstruction," Science, 296, (2002), 705, which will generate a current in either the fabric or the attached metal interconnects, and the use of nanoparticles or other functionalizing agents that can be employed to detect electromagnetic radiation, while the CNT fabric acts as a route for signal propagation to connected circuitry. These techniques, in part, give rise to various embodiments of the electromagnetic radiation detecting and sensing systems and methods disclosed herein.

The fabrication of CNT detectors that sense EM radiation from UV to IR and other radiation events such as gamma, alpha or beta radiation either with a functionalized or non-functionalized fabric is described below. In addition, the use of CNT fabrics for the creation of microbolometers that surpass the ease of fabrication, operational characteristics and resolution obtainable with current VOx technology is detailed below.

Other types of detectors that are related to EM detectors include thermistors and Resistive Temperature Detectors (RTDs), which employ the TCR of a material to detect temperature changes in a system. As stated above, the TCR is also very important for detection of EM with microbolometers. For a thermistor, as the temperature increases, the resistance of the thermistor decreases, hence negative TCR. The opposite is the case for RTDs where an increase in temperature produces an increase in the resistance and a positive TCR of the detector. Table 1 shows some TCR values of several materials that are typically used for either an RTD (positive TCR) or a thermistor (negative TCR).

TABLE 1

TCR values for several materials that can be used as either RTDs or thermistors.

| Material | TCR (° C. − 1) |
|---|---|
| Al | 0.0041-0.004308 |
| Au | 0.003715-0.004 |
| Pd | 0.00377 |
| Pt | 0.003729-0.003927 |
| Si | −0.07 |
| Ge | −0.05 |

As can be seen from Table 1, metals would typically be employed for RTDs, while semiconductors or metal oxides for thermistors. The temperature change of the detector can be determined by using the first-order linear equation $R=R_{ref}[1+\alpha(T-T_{ref})]$, where □ is the TCR of the detector material and $R_{ref}$ is the resistance of the material at $T_{ref}$ (typically at 20° C.). A higher order (and more accurate) analysis can be performed by using the Steinhart-Hart equation $$T = \frac{1}{a + b \ln R + c(\ln R)^3},$$

where a, b and c are Steinhart parameters. Thermistors are more sensitive than the RTD devices, typically be a factor of 10, since RTDs have a much smaller TCR value; therefore, there is a smaller resistance change associated with RTD devices with modulating temperatures compared to thermistors. Germanium thermistors are commonly used for temperatures ≦100 K; while, silicon thermistors are used between 100-250 K. Above 250 K, the TCR of silicon becomes positive, which leads to a decrease in the resistance, potentially skewing temperature data. Since some semiconductors or metal oxide thermistor materials have large energy gaps, they are ideally suited for high temperature detection. Thermistors also typically have resistance values between 1 k☐ to 10 M☐, while RTDs have resistance values <1 ☐.

For an RTD detector, Platinum is widely employed because it is a high melting point metal. The usable range for Pt RTDs is between −200-630° C. with possible detection up to 900° C., with reduced accuracy.

CNTs have unique electrical and thermal properties that also make them excellent candidates for temperature detection, along with EM detection. Specifically, carbon nanotube fabrics that have a very low metal contamination level (low parts-per-billion) can be readily deposited onto a wide variety of substrates and can be integrated with CMOS technology are an ideal candidate for thermistor or RTD technology. Very low contamination levels of carbon nanotube fabrics are more fully described in U.S. patent application Ser. No. 10/860,332, the entire contents of which are herein incorporated by reference.

CNT based thermistors (or RTDs) have many advantages over normal metal-oxide or single crystal semiconductor thermistors (or metal RTDs). One advantage is the ease of creating a CNT based thermistor (or RTD). CNT-thermistors (or RTDs), as with EM detectors, are readily fabricated using standard CMOS integration techniques such as spin-coating, optical lithography and Reactive Ion Etching (RIE), unlike current thermistor (or RTD) schemes, CMOS fabrication and integration techniques described in U.S. Pat. No. 6,706,402, U.S. patent application Ser. No. 10/341,005 and U.S. patent application Ser. No. 10/341,130, the entire contents of which are herein incorporated by reference. Besides using CMOS compatible materials, non-standard integration techniques can also be employed to fabricate CNT thermistors (or RTDs) on substrates such as flexible polymers, quartz, alumina, etc. CNT based thermistors and RTDs can also be fabricated with nanometer sized dimensions (<100 nm), which is not possible with current thermistor and RTD technology.

Another advantage of CNT temperature sensors is that the CNT detectors are able to handle a much larger temperature range than their conventional counterparts. As an example, carbon nanotubes should have a very wide sensing range because of their much larger melting point (>3000° C.) compared to RTD metals such as Pt (melting temperature: 1769° C.; range: −200° C.-600° C.) or thermistor semiconductor materials such as Ge (melting temperature: 938° C. range: <−173° C.).

Because CNTs, and more particularly the CNT fabric, have nanometer sized dimensions and are ballistic conductors over specific lengths, the CNT thermistors (or RTDs) are low power devices. The CNT thermistors or RTDs have minimal self-heating effects.

Having identified a need for a temperature-sensing platform using nanoscale technology, the present disclosure describes techniques that enable the use of CNT fabrics for the detection of temperature changes within in a system, specifically for integrated circuit (IC) technology, nanoelectronics and lab-on-a-chip technology. According to certain embodiments, the CNT thermistor/RTD may be functionalized to tailor the TCR properties of the fabric; while in another aspect the combination of thermal detectors and heat detectors is shown.

Fabrics of carbon nanotubes may be either suspended over gaps (90-180 nm, e.g.) or conformal to a substrate could be employed as EM detectors. With moderate photon count, detection should be possible either by photo-generation (photodiode), fabric heating (bolometer) or phonon-generation (photo-acoustic).

FIG. 1A illustrates an EM detecting element 100 constructed according to principles of certain embodiments of the invention. EM detecting element 100 includes a nanotube ribbon 102, a suspended region 106 of nanotube fabric, a gap region 110, an insulating layer 108 comprising one or more supports 104, electrodes 122 and driving circuitry 130.

The nanotube ribbon 102 of certain embodiments is formed from a non-woven fabric of entangled or matted nanotubes (more below).

Supports 104 are patterned out of insulating layer 108. Layer 108 may be of any appropriate material, such as, but not limited to, $SiO_2$, $SiN_x$, $HfO_2$, HfAlO, HfSiO, $TiO_2$, $Al_2O_3$ (crystalline and non-crystalline), MgO, Mylar, ZnO, BeO, fused-silica and other silica based insulators, plastics, porous membranes, and paper.

In certain embodiments, EM detecting elements have a suspended region 106 of nanofabric overlying a gap 110, above a second substrate material 112. Second substrate material 112 may be an insulator such as one listed above and may be the same insulating material as 108 or second substrate material may be a semiconductor (such as, but not limited to, Si (single crystal, polycrystalline and amorphous), Ge, SiGe, SiC, Diamond, GaN, GaAs, GaP, AlGaAs, InP, GaP, CdTe, AlN, InAs, $Al_xIn_{1-x}P$, and other III-V and II-VI semiconductors) or a conductor (such as, but not limited to, Al, Cu, W, Al (<1% Cu), Co, Ti, Ta, W, Ni, Mo, Ru, Pd, Pt, Ag, Au, Au/Ti, Bi, Ca, Cr, Cr/Au, Fe, In, Mg, Na, Os, Pb, Rh, Sb, Sn, Pb/Sn, Pb/In, Zn, TiW, $CoSi_x$, $WSi_2$, $TiSi_x$, TaN, TiN, TiAlN, RuN, RuO, PtSi, $Pd_2Si$, $MoSi_2$, $NiSi_x$, RhSi and $ZrSi_2$). The suspended region 106 of nanofabric 102 defines the EM sensing region of the detecting element 100. The EM detection from the detecting element 102 is controlled by driving circuitry 130.

Figure 1B:
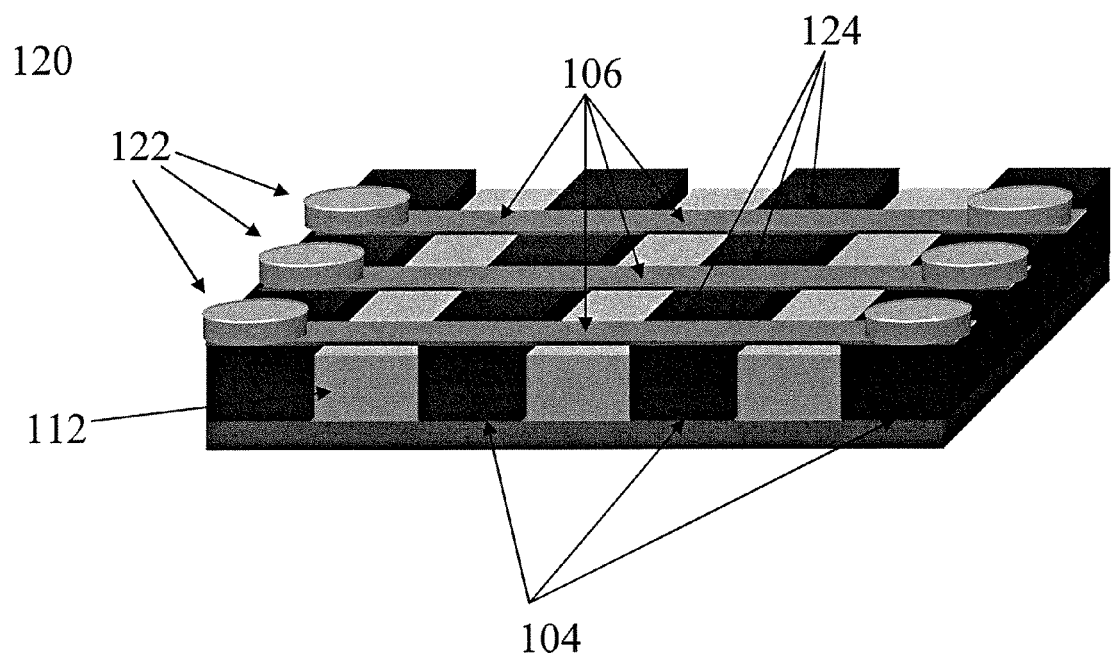
FIG. 1B illustrates an array of detecting elements according to certain aspects of the invention with a suspended nanofabric.

FIG. 1B illustrates an array 120 of detecting elements 100.

In array 120, electrodes 122 are connected by nanotube traces 112 and the array of suspended nanofabric regions 106 are each capable of acting as a detecting element 100.

Figure 1C:
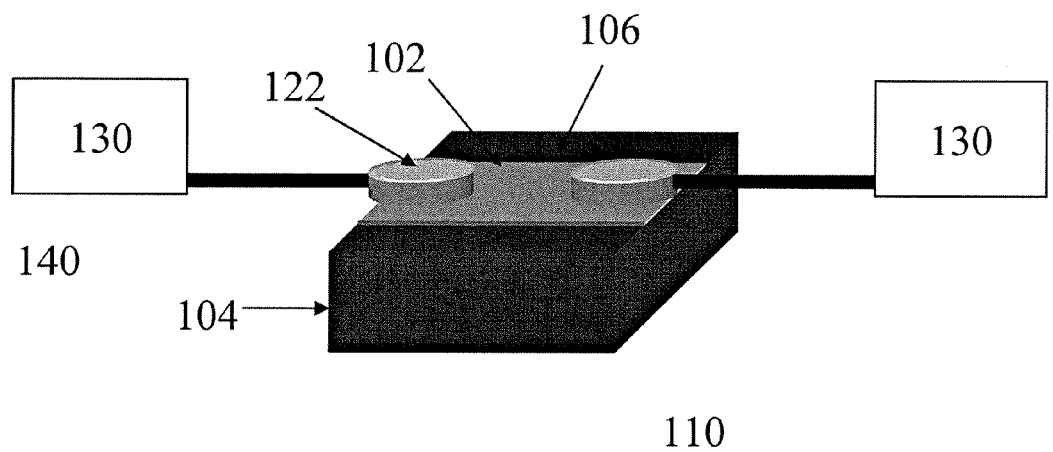
FIG. 1C illustrates a detection element according to one aspect of the invention with a non-suspended nanofabric.

FIG. 1C illustrates a non-suspend EM detecting element 140 that is conformal to substrate 104 such as, but not limited to, silicon, $SiO_2$, $SiN_x$, GaAs, GaN, plastics, paper, etc. This device is similar to FIG. 1A except that the carbon nanotube fabric detection area is not suspended. Non-suspended devices are easier to fabricate; however, the substrate of a non-suspended device may adversely affect or skew the ability of the nanotube fabric to detect EM, by adsorbing a percentage of the EM radiation or perturbing the structure of the nanotubes, which, in turn, alters the properties of the nanotube fabric. Depending on the application, a suspended fabric will be more desirable, such as microbolometers where thermal isolation is important; however, other applications such as EM detection by exciton generation or through functional agents a non-suspended may be more appropriate.

The substrate 104 in FIG. 1C may also be a reflective substrate in relation to the desired EM detection spectrum. Such reflective coatings are known in the art.

Figure 1D:
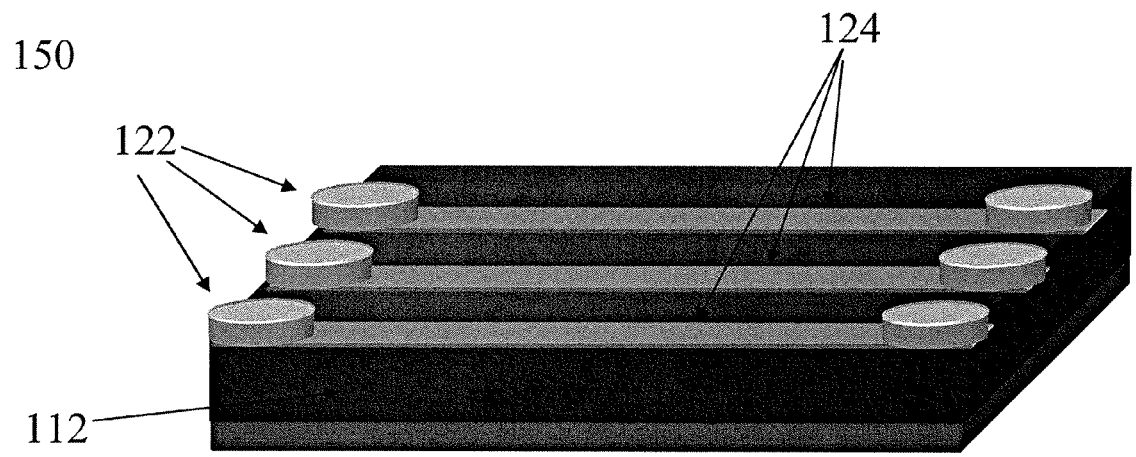
FIG. 1D illustrates an array of detecting elements according to certain aspects of the invention with a non-suspended nanofabric.

FIG. 1D illustrates and array 150 of non-suspended light detectors 124.

Suspended and non-suspended SWNT devices may be fabricated by spin coating, spray-coating, dip-coating or growing by CVD on a substrate as described in U.S. Pat. Nos. 6,706,402 and 6,835,591, as well as in U.S. patent application Ser. Nos. 10/341,054 and 10/341,130, the entire contents of which are herein incorporated by reference. The nanotube fabric can then be patterned and electrically interconnected by using standard (photolithography) and non-standard (electron-beam or nanoimprint) lithography, etching (Reactive Ion Etching in oxygen) and metal deposition techniques (physical vapor deposition, chemical vapor deposition, electro-chemical deposition). Such fabrication is more fully described in the incorporated references.

EM radiation can be impinged on the open area of these SWNT fabrics to cause the generation of a photocurrent, such as a photodiode, the generation of heat in the fabric, such as a bolometer, or the generation of phonons in the fabric by the photo-acoustic effect.

Methods of making suspended nano-fabrics suitable for certain embodiments of the invention are disclosed in the incorporated patent references, including U.S. Pat. No. 6,706,402 and U.S. patent application Ser. Nos. 10/776,059 and 10/776,572 and WO 01/03208. Nanofabric ribbons or segments or belts made from a matted layer of nanotubes or a non-woven fabric of nanotubes are used as a conductive element which detect EM radiation. At points in this disclosure, the ribbons are referred to as traces or detecting or sensing articles or conductive articles. In some instances, the ribbons are suspended, and in other instances they are disposed conformally on a substrate.

Under certain embodiments of the invention, the sensing articles may be made from a nanotube fabric, layer, or film. SWNTs with tube diameters 0.5-4 nm or multi-walled nanotubes (MWNTs) with diameters >2 nm are electrical conductors that are able to carry extremely high current densities, see, e.g., Z. Yao, C. L. Kane, C. Dekker, Phys. Rev. Lett. 84, 2941 (2000). They also have the highest known thermal conductivity, see, e.g., S. Berber, Y.-K. Kwon, D. Tomanek, Phys. Rev. Lett. 84, 4613 (2000), and are thermally and chemically stable, see, e.g., P. M. Ajayan, T. W. Ebbesen, Rep. Prog. Phys. 60, 1025 (1997). However, using individual nanotubes for EM detection can be problematic because of difficulties in growing them with suitably controlled orientation, length, and the like. Creating traces from nanotube fabrics allows the traces to retain many if not all of the benefits of individual nanotubes. Moreover, traces made from nanotube fabric have benefits not found in individual nanotubes. For example, since the traces are composed of many nanotubes in aggregation, the trace will not fail as the result of a failure or break of an individual nanotube. Instead, there are many alternate paths through which electrons may travel within a given trace. In effect, a trace made from nanotube fabric creates its own electrical network of individual nanotubes within the defined trace, each of which may conduct electrons. Moreover, by using nanotube fabrics, layers, or films, current technology may be used to create such traces.

For EM detectors, using a fabric of nanotubes also increases the detection area/cross-section, allowing for much higher detection efficiencies compared to individual nanotubes.

Because creation of suspended nanotube-based detector elements is like fabrication of suspended nanotube-based memory elements described in incorporated documents, the current description of their architecture is brief. Reference may be made to U.S. Pat. No. 6,706,402, and U.S. patent application Ser. Nos. 10/341,005, 10/341,055, 10/341,054, 10/341,130 and to WO 01/03208 for fuller description and background.

For non-suspended nanotube-based detector elements, the fabrication of such substrate conformal elements has been described in U.S. Pat. Nos. 6,924,538 and 7,112,464 and U.S. Pat. Publication. No. 2004/0181630, the entire contents of which are incorporated by reference.

Under another embodiment of this invention, the CNT fabric consists of a monolayer (~1 nm) up to a thick multilayer (>>10 nm) fabric.

Multilayered fabrics may be more suited for EM sensing. Multilayered fabrics will maximize the detection area of the nanotube detector, where as, monolayer fabrics, which may contain a porosity of 80-90%, will have a low detection efficiency due to the limited sensing surface area.

To increase the adsorption of the nanotube fabric, either monolayered or multilayered, a reflective substrate or thin film can be employed. Depending on the desired detection range, the substrate can be tailored. As an example a Copper, which reflects LWIR, substrate can be employed to reflect IR radiation back into the CNT fabric, increasing IR energy adsorption. Although this appears to be more suited to non-suspended fabrics, suspended fabrics can also employ the benefits of a reflective substrate or thin film, in which a cavity is lined with a reflective medium (see microbolometers below).

Figure 2:
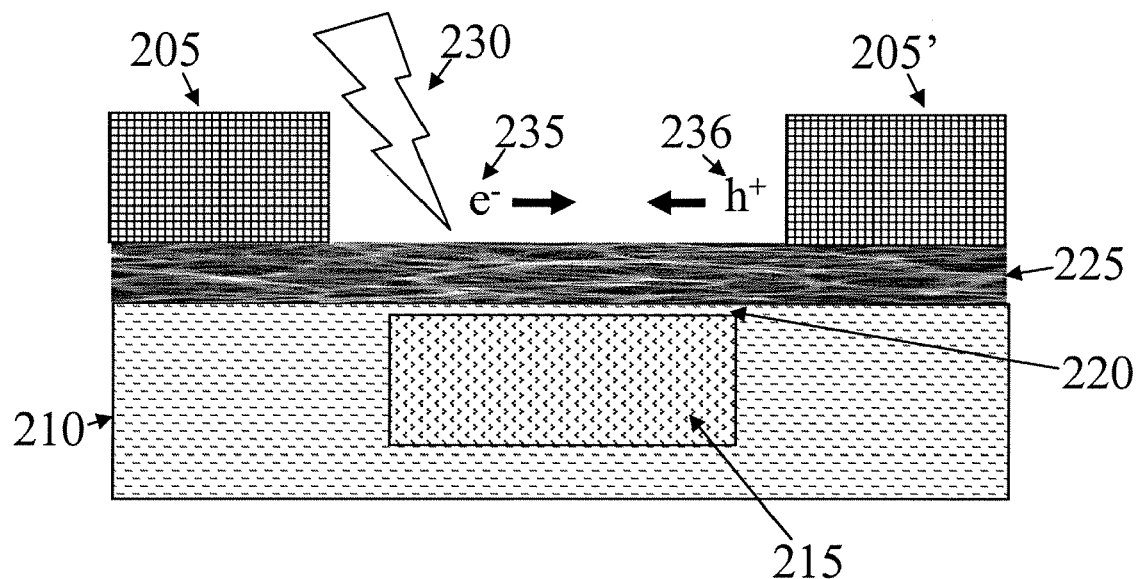
FIG. 2 illustrates nanofabric photodiode.

As stated previously, the inventors envision several processes that permit detection of EM radiation with CNTs. The physical properties of these techniques are known in the art and other techniques that are not currently known may also be employed to create EM detectors. Under one embodiment of this invention, the nanotube fabric is used as a photodiode to detect EM radiation. FIG. 2 shows detector element 200, which generates photocurrent due to the recombination of electrons 235 and holes 236. Nanotube detecting element 225 is disposed onto substrate 210 and electrically contacted to source-drain electrodes 205 and 205'. The nanotube detector fabric is gated with gate electrode 215 separated from the nanotube fabric 225 by a thin dielectric 220. The gating of the nanotube fabric allows for hole 236 generation from the drain region 205' into the nanotube fabric 225 due to a small Schottky barrier. Thus, in one particular embodiment including pristine nanotubes, when light 230 impinges on nanofabric detector 225, electrons 235 are created in the nanotube fabric, which combine with holes 236 and generates current.

Related to this technique but not shown is the creation of excitons (electron-hole pairs) that can be used to detect EM radiation.

This photodiode detector can also be fabricated with a suspended nanotube fabric, which is not shown in this invention.

Figure 3:
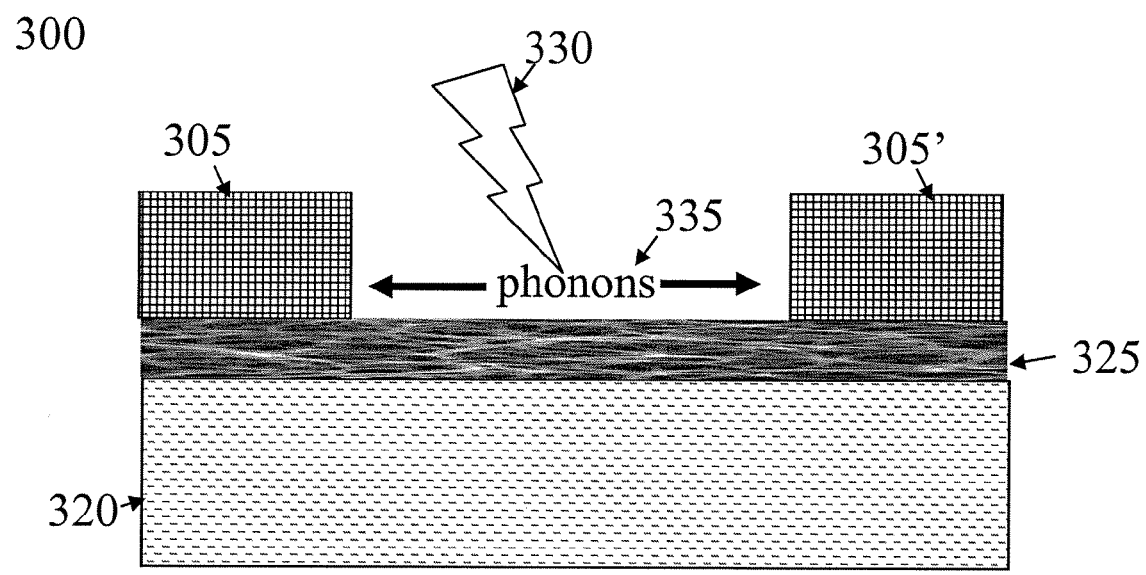
FIG. 3 illustrates a nanofabric photo-acoustic detector.

Another embodiment of this invention uses the photo-acoustic effect to detect electromagnetic radiation. FIG. 3 shows photo-acoustic detector 300 with disposed nanofabric detector 325 on substrate 320 with electrical contacts 305 and 305'. For this detector, light 330 impinges nanofabric 325 to produce phonons 335. These phonons will in turn traverse the nanofabric and interact with electrodes 305 and 305'. The interaction between the generated phonons and electrodes will either cause a generation of electrons in the electrodes which can be sensed as a current with appropriate sensing circuitry, not shown, or produce heating which will cause a resistance change in the electrodes that can be sensed with appropriate sensing circuitry, not shown.

For this type of EM detector, a suspended fabric (not shown) may be more ideal to prevent the loss of phonons to the substrate. It is expected that the EM radiation will generate optical phonons, which in turn, scatter to form either electrons or acoustic phonons. The acoustic phonons can readily be lost into the substrate and not contribute to the detecting signal; therefore, removal of the underlying substrate should greatly improve the sensing efficiency.

Figure 4:
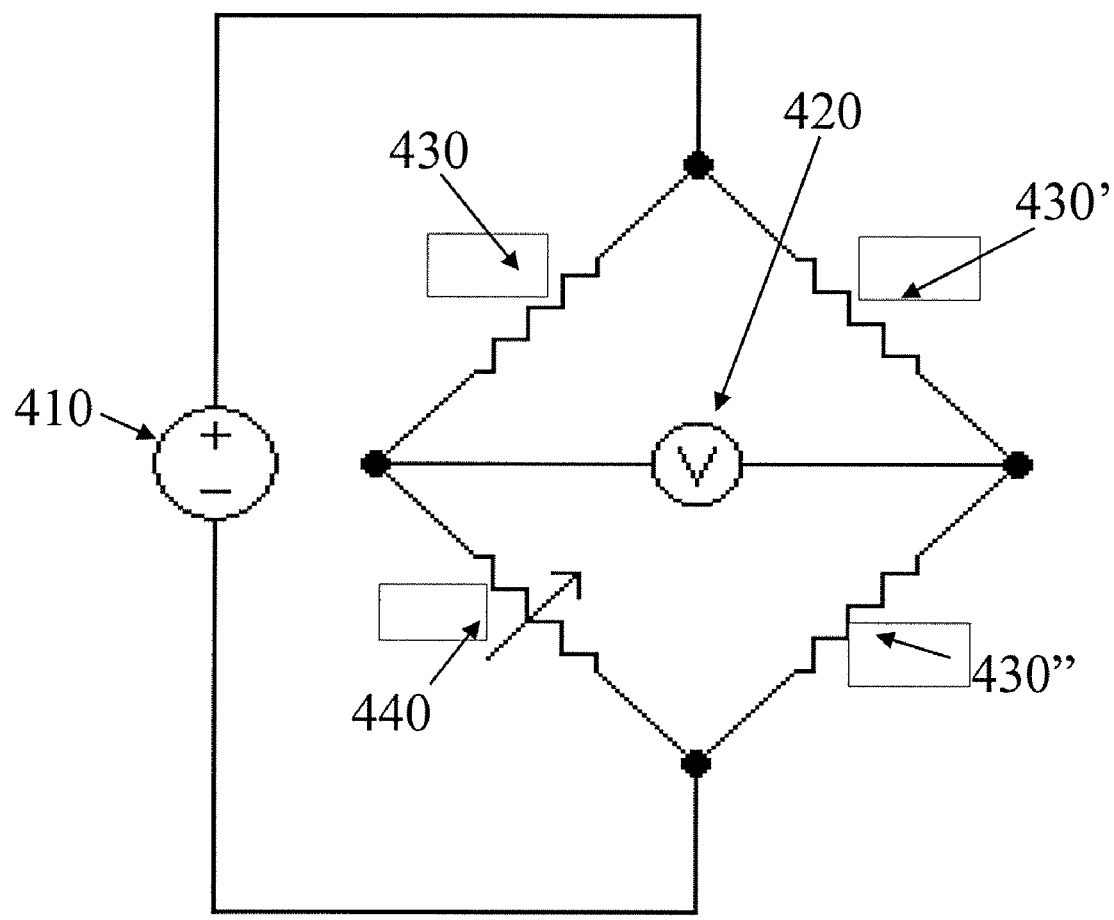
FIG. 4 illustrates Wheatstone bridge photodetector circuitry.

Under another embodiment the light detecting nanofabric is used as a bolometer. A circuit schematic 400 of a conventional bolometer is given in FIG. 4, showing a Wheatstone Bridge structure. Input voltage 410 is connected at one point between resistor 430 and 430' and at a second point between resistor 430" and 440. Resistors 430, 430' and 430" are of known value. Resistor 440 is the detector resistor which will vary depending on the impingement of electromagnetic radiation. The output voltage of the circuit is measured with voltmeter 420.

Figure 5A:
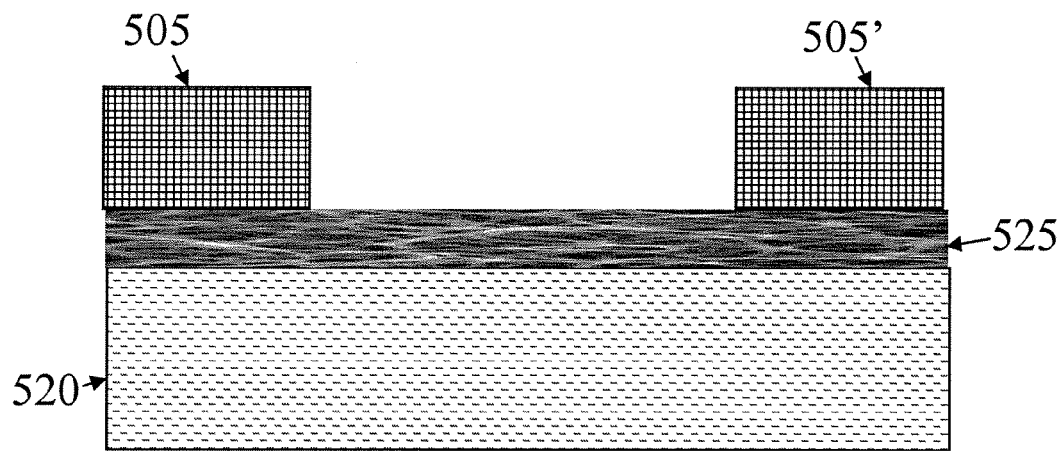
FIGS. 5A and 5B illustrate a nanofabric bolometer.
Figure 5B:
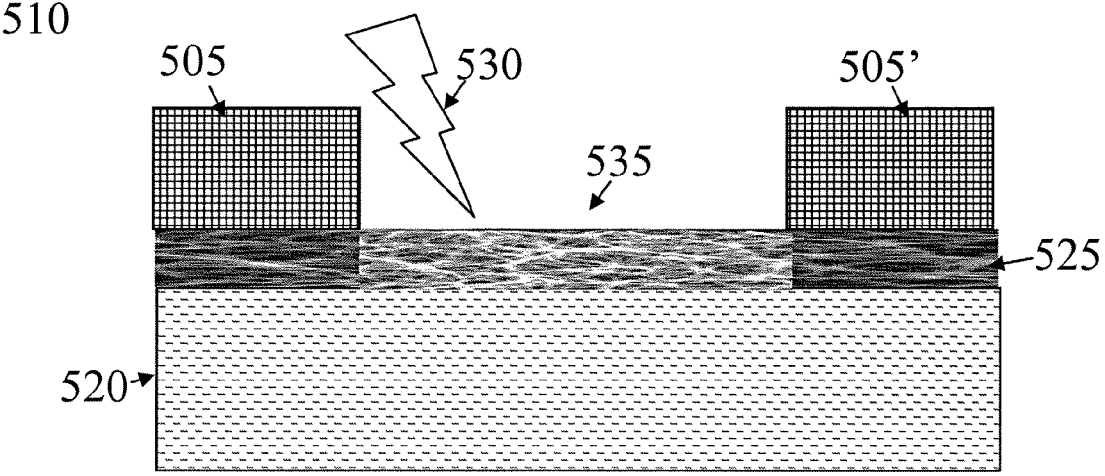

A simple nanofabric bolometer 500 is shown in FIGS. 5A and 5B. More advanced and realistic CNT bolometer designs and descriptions are presented further below. For FIGS. 5A and 5B, nanofabric detector 525 is disposed onto substrate 520 and connected to interconnects 505 and 505'. In FIG. 5A, no light is impinging on the nanofabric sensor, hence, no heating and EM detection is occurring. In FIG. 5B, light 530 is impinging on nanofabric 525 causing heating and changing the resistance of nanofabric 525 to nanofabric 535. This change in resistance can then be measured with appropriate sensing circuitry, not shown.

Figure 6A:
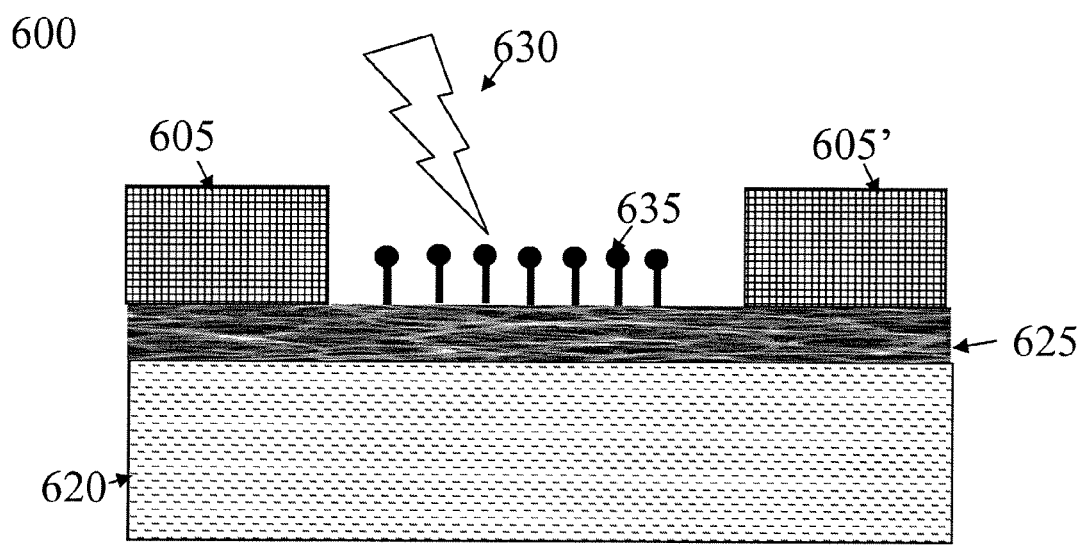
FIG. 6A illustrates a nanofabric detector with attached photosensing materials.

All of the above embodiments can have a functionalized nanotube fabric as shown in FIG. 6A, structure 600. For this structure photoconductive nanoparticles or EM sensitive molecules 635 are functionalized, doped, or adhered to nanofabric 625 to enhance the sensing properties of the nanofabric. Examples of nanoparticles and EM sensitive agents are given below.

Figure 6B:
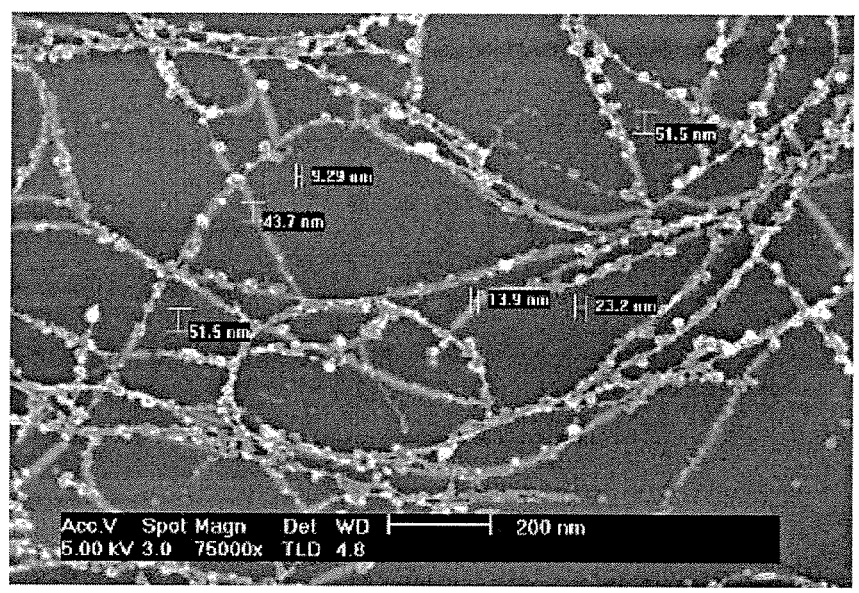
FIG. 6B shows an FESEM micrograph of nanoparticles attached to carbon nanotubes.

FIG. 6B shows an FESEM micrograph of a sparse nanotube fabric that has been impregnated with silica nanoparticles. It is envisioned by the inventors that a wide variety of nanoparticles from conductors, to semiconductors and insulators can be attached to the nanotube fabric either during the synthesis of the nanotube solution, as described in U.S. Pat. No. 6,990,009, U.S. Pat. Publication Nos. 2005/0269553 and 2005/0058797 and U.S. patent application Ser. No. 10/860,331, the entire contents of which are hereby incorporated by reference, or during the fabrication of the detector by direct deposition of the nanoparticles.

Under an embodiment of this invention, the CNT EM detector is functionalized or doped with a photoconductive materials. An example of a possible photoconductive material would be nanoparticles of GaN such as those produced by Kabra et al in "Gallium nitride nanoparticles for solar-blind detectors," Proceedings of the Indian Academy of Science (Chemical Science), 115 (2003), 459-463. These additive photoconductive materials would enhance the range and efficiency of the nanofabric detectors. It would then be possible to use the nanoparticles to detect photons with energies in the UV and the nanofabric to detect energies in the IR range. Depending on the type of photoconductive nanoparticle, a wide range of light spectrum can be detected. Other types of nanoparticles can consist of, but are not limited to, SiC, Si, Diamond, GaAs, GaP, AlGaAs, InP, GaP, CdTe, AlN, Ge, InAs, $Al_xIn_{1-x}P$, etc, which are typical semiconductor materials utilized for EM detection from UV to IR.

Doping a CNT fabric with nanoparticles provides an additional benefit that the III-V, II-VI and non Si IV semiconductors are not compatible with Si CMOS integration techniques. Doping the CNT fabric with these nanoparticles permits the incorporation of these non Si CMOS materials into Si CMOS integration. Therefore, an aspect of this invention is the doping of nanotube fabrics with semiconducting nanoparticles that would be used to detect specific photon energies. As charge is generated in the nanoparticles, the charge is transferred to the CNT fabric, which in turn passes the charge to appropriate sensing circuitry.

In related embodiments, the EM sensors may detect gamma rays and other radiation particles, x-rays, visible light, infrared or radio waves, while in other embodiments, the sensor are multicolor—i.e. detect from gamma rays to IR. The nanofabric may be functionalized, either non-covalently or covalently (e.g., by derivatization) so as to interact specifically with a particular radiation energy. The functionalization of nanotube fabrics for the production of an electrical change in the nanotube fabric has been more fully described in U.S. Pat. Publication No. 2005/0053525, and will not be presented in further detail here, as the entire contents of this publication are herein incorporated by reference. Various embodiments are understood to use the principle that charge transfer between carbon nanotubes and adsorbed molecules (which are altered by the absorption of EM radiation) changes the nanotube conductance, so as to provide novel nanosensor schemes.

Sensors according to certain embodiments can be used in a way that allows detection and measurement of differences in their conductance or other electrical properties before and after the functionalized nanotubes are exposed to radiation.

The change in the sensor's electrical properties may be measured in conjunction with a gating electrode, disposed below or adjacent to the nanotubes, via a field effect on the semiconducting nanotubes, see, e.g., P. Qi et al., "Toward Large Arrays of Multiplex Functionalized Carbon Nanotube Sensors for Highly Sensitive and Selective Molecular Detection," Nano Lett., vol. 3, no. 3, pp. 347-51 (2003). When changes are detected in this way, it may be preferable to utilize a sensor with a suspended nanofabric structure.

As another example, nanotube fabrics may be used to sense X-rays by the functionalization of the film with a substance such as iohexyl (a non-ionic contrast agent that absorbs x-rays). The inventors envision the functionalization of the nanotube fabric with an X-ray absorbing compound that once exposed to x-rays causes an electrical change in the nanotube fabric. The electrical perturbation in the nanotube fabric can be measured either by a resistance change or by a capacitance change. Sensing changes in a nanotube fabric have been more fully described in U.S. Pat. Publication No. 2005/0053525.

Another possible radiation absorbing element is fluorodeoxyglucose (employed as a radioactive tracer isotope in Positron Emission Tomography). It is theorized that by utilizing a gated nanotube fabric, the fluorodeoxyglucose is exposed to X-ray radiation and decays by emitting a positron. The emitted positron then interacts and annihilates with electrons in the gated nanotube fabric. The annihilation of electrons in the nanotube fabrics causes the flow of a current through the fabric that can be sensed with appropriate circuitry. Such sensor technology is more fully described in U.S. Patent Publication Nos. 2005/0053525 and 2005/0065741, the entire contents of which are herein incorporated in their entirety.

Other possible molecules, elements or compounds for EM detection are absorbing agents such as butyl methoxydibenzoylmethane (used for absorbing harmful UVA radiation in sunscreens) or radiopharmaceuticals such as, but not limited to, In111-Diethylene triamine pentaacetic acid, Technetium-99 compounds, etc.

The inventors also envision the ability to combine the chemical sensing aspects of a nanotube fabric, as detailed in U.S. Pat. Publication Nos. 2005/0053525 and 2005/0065741, with the reactivity of specific molecules/compounds to radiation. As an example, a molecule that is chemically altered by the impingement of radiation can be detected by the nanotube chemical sensor. The inventors theorize that a normally undetected molecule is in suspension or in physical contact to the nanotube fabric. Upon exposure, the molecule physically changes so that it is now detectable by the nanotube chemical sensor, which will be registered by an electrical change in the fabric.

These nanotube EM detectors have several important and unique features that are not available with existing technologies. First, arrays of these nanotube EM detectors can be formed using patterning technology at minimum dimensions of the lithography node used, i.e. Giga-sized CNT fabric EM detector arrays can be fabricated at 180 nm or smaller critical dimension size. Such methods are more fully described in incorporated references, e.g., U.S. Pat. Nos. 6,574,130, 6,643,165, 6,706,402, 6,784,028, 6,911,682, 6,919,592, and 6,924,538; and U.S. patent application Ser. Nos. 10/341,005, 10/341,055, 10/341,054, 10/341,130, and 10/776,059. Second, such nanofabric-based detector devices scale directly with the lithographic ground rule used, i.e. 180 nm, 130 nm, 90 nm and 65 nm sized emitters can be produced. Third, monolithic CMOS integration of these detector arrays can be accomplished using the fabrication and integration of self-encapsulated electromechanical switching cavities as described in incorporated references. Fourth, EM detection in these embedded arrays can be individually controlled (turned on/off) by transistors or other types of switch technologies such as nanotube memory. This is the first demonstration of a manufacturable technology that can be integrated at a level of as few as one EM detector per transistor/memory cell. The combination of these features allows for the design and fabrication of high resolution EM detector arrays, specifically >640×480 resolution IRFPAs, that is currently not possible with current detector technology.

Certain embodiments of the invention allow integration at a level of one EM detector per transistor at the minimum dimension of a given lithography node or the integration of large arrays that are addressed by CMOS logic circuits. Previously only discrete components, such as silicon p-n diodes or non-embedded microbolometers, could be used as EM detectors for optoelectronic circuits. Other types of detectors require complex and difficult fabrication techniques such as flip-chip processes to integrate with silicon semiconductor technology. Because CNT EM sensors can be integrated to form VLSI arrays, thus enabling optical interconnects with one light detector per transistor (or waveguide, depending on function), the fabrication of ultra-dense optical circuits is possible.

A certain embodiment of this invention is the use of CNT fabrics as microbolometers, simple structure presented in 5A and 5B. VOx microbolometers may be replaced with CNT microbolometers for IRFPAs with the ability to detect light in the IR but also possibly in the UV range (not possible with current microbolometer technology). The use of carbon nanotubes in a resistive microbolometer sensor with wide wavelength detection is described below.

This focal plane design is unique because earlier applications (See, for example, U.S. Pat. No. 5,450,053) using microbolometer technology were sensitive to radiation in the IR (LWIR 8-12 microns) and Millimeter wave frequencies (94 GHZ). U.S. Pat. No. 5,450,053, entitled "Use of Vanadium Oxide in Microbolometer Sensors," discloses radiation sensitivity in the MWIR band (3-5 microns), but more recent data has shown that the responsivity of these devices is low and therefore insufficient for use. In addition UV sensitivity has not been available to these types of structures in the crucial 0.25-0.3 $\mu$m band.

The use of CNTs in resistive microbolometer structures will have a distinct advantage over VOx because for the first time multi-color UV/IRFPAs will be possible with one dimensional or two dimensional arrays on a silicon substrate.

The fabrication of these CNT based arrays will be possible because of the proven capability to processing CNTs in CMOS, SOI and Bipolar wafer processing facilities. Processing capabilities are more extensively described in U.S. patent application Ser. Nos. 10/860,332, 10/341,130, and other patents and applications incorporated by reference. As stated previously, this capability is due to purification of the CNTs and removal of any elements or contaminants that will prove detrimental to CMOS, SOI and Bipolar silicon wafer processes—as is well-known in the art and detailed in the incorporated references.

The microbolometer structure that is sensitive in the UV/MWIR/LWIR bands is adaptable to both one dimensional and two dimensional array designs. The basic VOx microbolometer structure is described in FIG. 7—taken from U.S. Pat. No. 5,450,053. In this structure silicon substrate 700 is used as a base for the microbolometer and as a heat sink. The detecting element 701 incorporates VOx absorbing element 702 and IR transparent dielectric layer 703. IR transparent layer 703 consists of highly doped $SiN_x$ that acts as a mechanical support for the cantilevered detecting element 701 and as a conducting medium to transport the signal to metal electrode 704 (listed as X-line in schematic). Etched cavity 705 is used to thermally isolate detecting element 701, allowing for the fabrication of un-cooled IR detectors.

Figure 7:
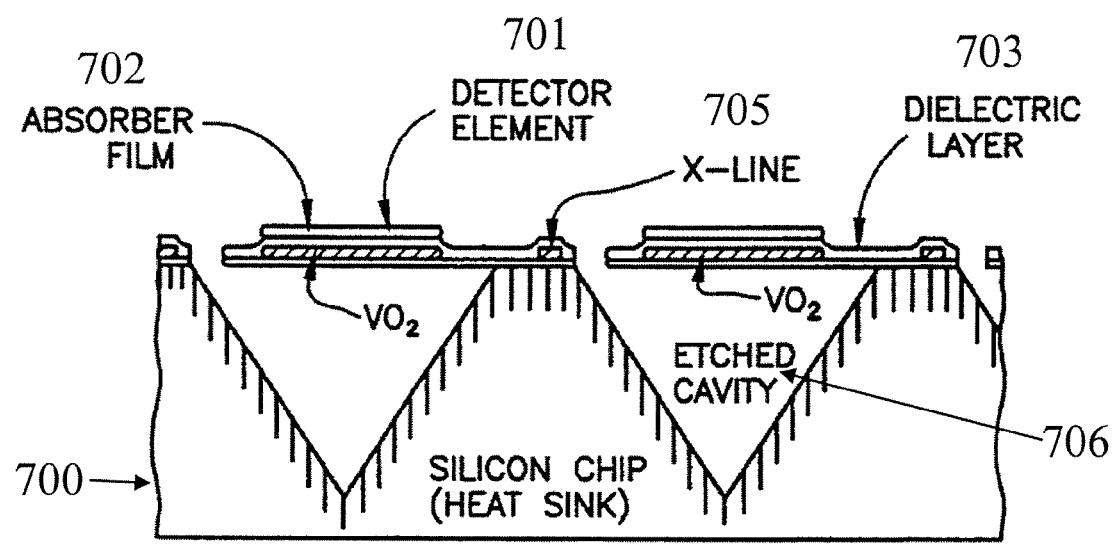
FIG. 7 displays a VOx microbolometer.
Figure 8A:
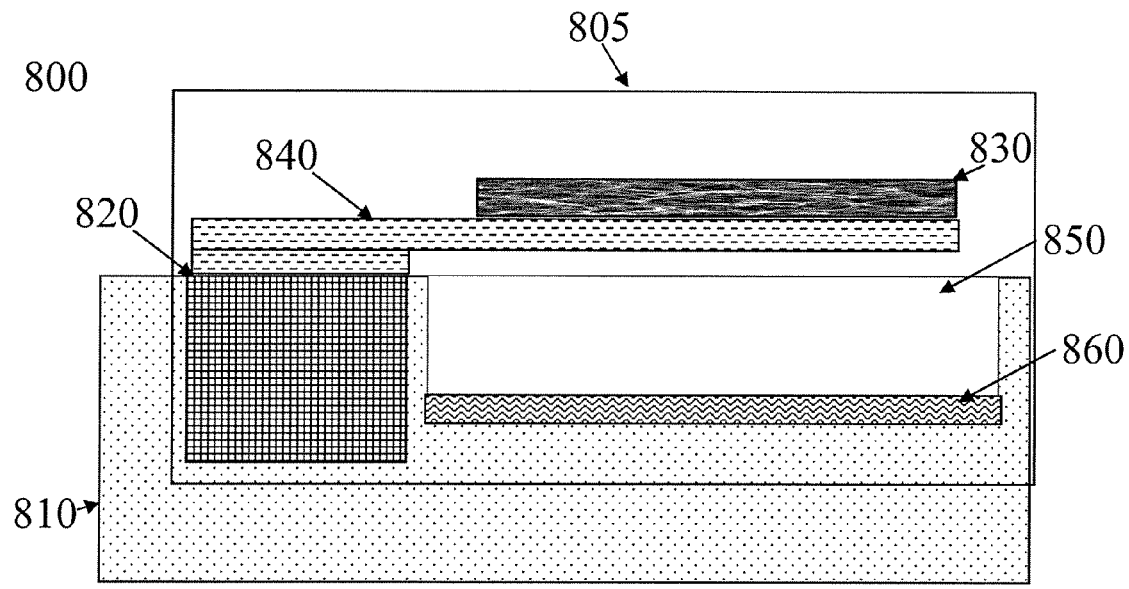
FIGS. 8A-C show designs of CNT microbolometers using similar fabrication techniques as current VOx technology.

FIG. 8 shows a similar microbolometer structure as FIG. 7; however, the VOx adsorbing material is replaced with a CNT fabric. In structure 800 (FIG. 8A), substrate and thermal sink 810 has a fabricated detecting element 805 that consists of an IR absorbing nanotube layer 830 with IR transmitting silicon nitride layer 840, cavity 850, reflective coating 860 and metal electrode 820. Note that only one electrical contact is shown in structure 800 and the metal electrode 820 can be connected directly to sensing circuitry or to underlying CMOS transistors.

Figure 8B:
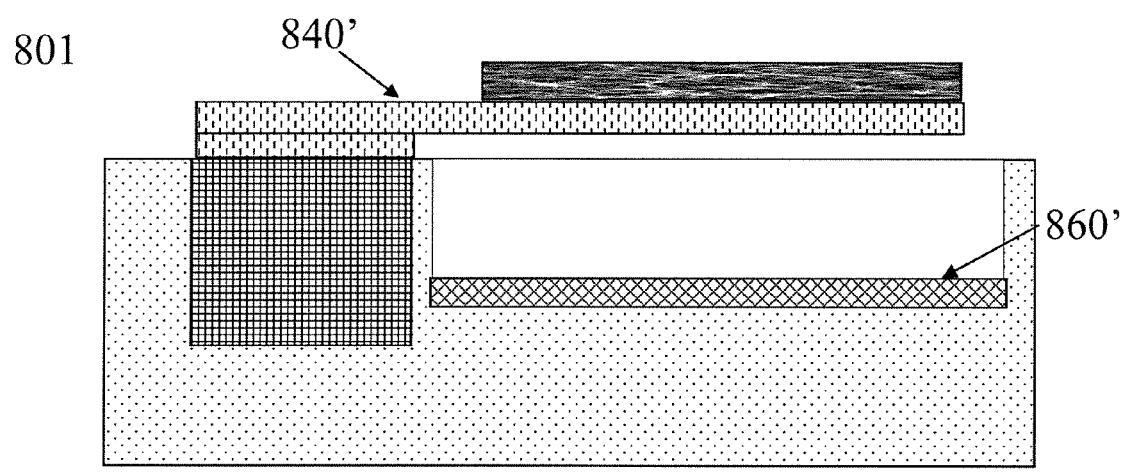

FIG. 8B shows a similar microbolometer structure 801; however, instead of silicon nitride cantilever 840, a ZnO cantilever structure 840' is employed, which transmits UV radiation, and instead of IR reflector 860, UV reflector 860' is employed.

CNT fabric 830 is spin- or spray-coated on top of the 840 silicon nitride cantilever beam structure (IR detection) or 840' ZnO cantilever structure (UV detection). Structures 830, 840 and 840' can readily be fabricated use CMOS photolithography and plasma etching techniques. CNT absorption has been demonstrated to be on the order of 70-80%, which coupled with the reflected radiation (described below) could increase the overall quantum efficiency of the microbolometer to over 90%, much greater than current VOx microbolometers.

Cavity 850 can readily be fabricated and has been previously described in incorporated references by employing a sacrificial layer. The sacrificial material can be amorphous or poly-silicon; however, any material that can be deposited, planarized and then wet, dry or vapor-phased etched with CMOS compatible processes can be employed. The cavity 850 forms the cantilever beam structures that thermally isolate the microbolometer detecting region.

Reflective coating 860 or 860' on the bottom of the cavity 850 reflects the radiation not absorbed by the first transmission through the CNT fabric. These reflective coatings can be tuned for the multicolor response such as MWIR, LWIR or UV. As an example, Cu is an ideal reflector LWIR, while Al can be employed for UV. These reflective coatings are known in the art and the inventors envision using reflective coatings depending on desired detection spectrum. A more detailed description of CNT fabric coatings and methods for providing them are included in U.S. Pat. Nos. 6,706,402 and 6,835,591.

Figure 8C:
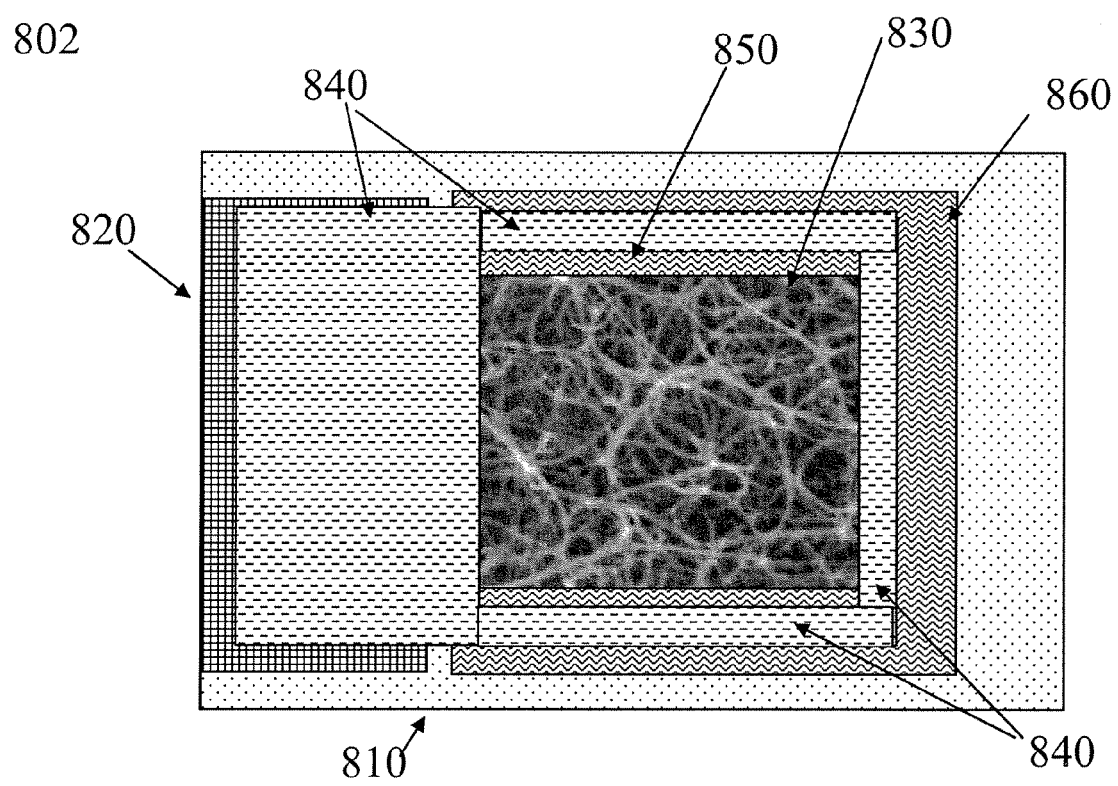

FIG. 8C shows a top-down view 802 of structures 800 and 801. The important aspects of the planar view is that the nanotube fabric 830 can be either suspended freely with highly-doped silicon nitride clamp structures 840 or the nanotube fabric 830 can be deposited conformally on top of a highly doped silicon nitride plank. For the freely suspended nanotube fabric scenario, a gap 850 between the silicon nitride 840 and the nanotube fabric 830 is shown for demonstration. In reality, the nanotube fabric 830 would be connected to all the edges of the silicon nitride structure, similar to a picture frame.

Figure 9A:
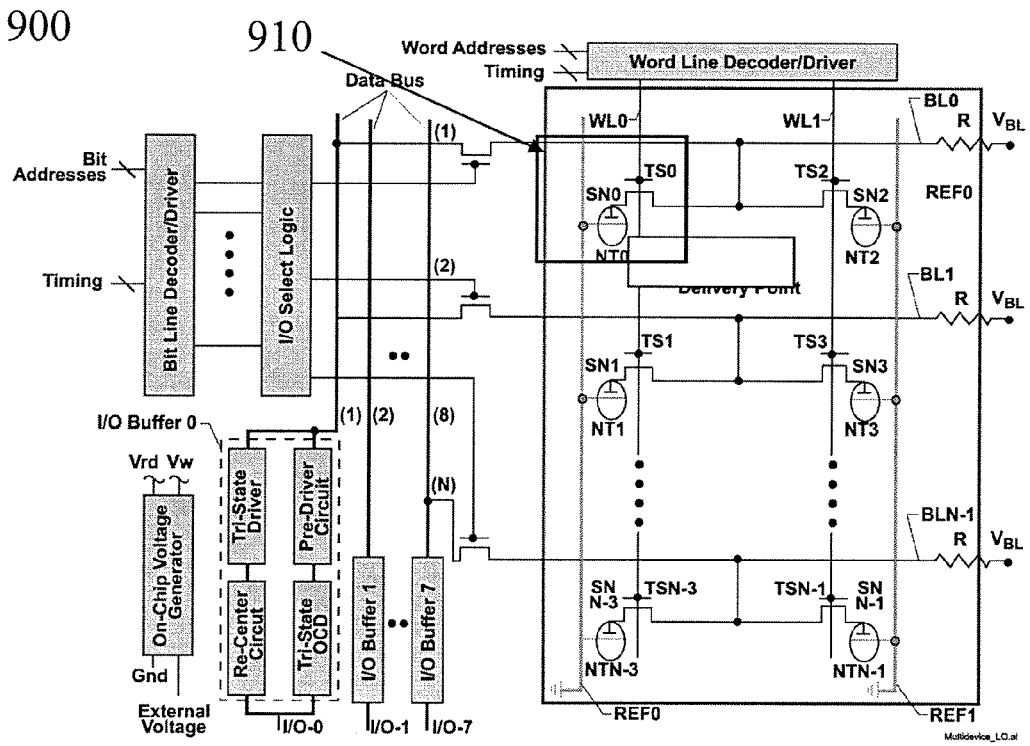
FIGS. 9A and 9B show circuit schematics of a CMOS integrated CNT microbolometer.
Figure 9B:
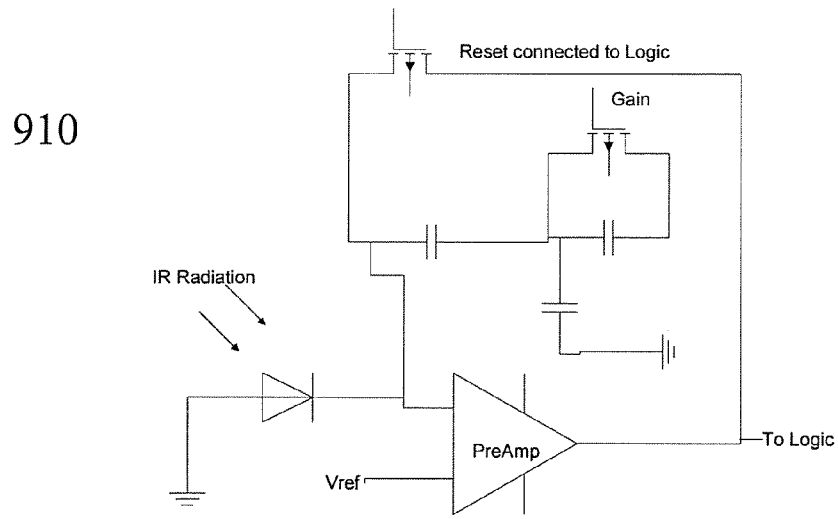

Metal electrode 820 is connected to CMOS transistors or sensing circuitry that is not shown. The structures 800 and 801 can be fabricated on the top of CMOS wafers with read out designs consisting of preamplifiers, integrators, sample and hold circuits and column multiplexer. The analog to digital converters, which are 14 bit can either be integrated in the design or accomplished off chip. FIG. 9 shows a possible circuit schematic of an entire CMOS embedded IR detector 900 device consisting of the CNT IR sensors (910), transistors, reference cells, and the CMOS Logic drivers, buffers and addressors. FIG. 9B shows a schematic of the highlighted region 910 of CNT IR detector circuitry represented in FIG. 9A. This schematic has an additional capacitive trans-impedance amplifier for detector readout, which has been proven to increase the S/N ratio for VOx bolometers. Here, the CNT detector (represented by the diode and which contains the CNT bolometer and attached transistors) is connected to the preamp at one input, while the second input is connected to a reference voltage. The output of the preamp is attached to the digital logic circuits. Because of Nantero's CNT CMOS compatibility, similar circuitry as VOx bolometers can be designed for a CNT bolometer.

The dimensions of IRFPAs are optimized to minimize the 1/f noise of the microbolometer structure. Snow (See Snow, E. S. et al., "1/f noise in single-walled carbon nanotube devices", Applied Physics Letters, Vol. 85, No. 18 (2004) 4172-4174) has found that for detector resistive materials of 10-108 $\square m^2$, CNT resistive microbolometers follow the empirical equation Sv=9×10E-11 ((R/L ^1.3) (V/F)). Therefore, pixel areas for CNT microbolometers of 50 $\square m^2$-15 $\square m^2$ are optimal for enhanced signal to noise ratio. Because NETD is inversely proportional to pixel size, reducing the pixel size from 50 $\square m^2$ to 15 $\square m^2$ will result in greater then 10× improvement in NETD. Pixel sizes of 25 $\square m^2$ (current and limiting technology node for VOx) results in 640×480 pixel arrays. Therefore, pixel sizes of 15 $\square m^2$, which the inventors envision for CNT microbolometers) will result in 1280×960 pixel arrays with high fill factors and within the limits of chip sizes possible with current processing state of the art. Reducing for 25 $\square m^2$ to 15 $\square m^2$ sized pixel arrays will also minimize the cost of the optics, which is a major cost driver for these types of optical systems.

The CNT micro-sensor presented in FIGS. 8A and 8B is also a low mass sensor element that is thermally isolated from its environment. Previous work has shown that electrical power dissipated in the micro-sensor heats the CNT sensor element by an amount that is inversely proportional to the mass of the resistive element and thermal conductivity to the surrounding environment. The dissipated heat will flow to the surrounding structure with a time constant given by the thermal capacity times the thermal resistance to the surroundings. The response time will be on the order of 100 milliseconds while achieving sensitivity. The CNT microbolometer will possibly be a high sensitivity detector because it meets the following requirements: high TCR, low 1/f noise, fast and operate under low power conditions, possibly have high sensitivity, can be deposited as a thin film (<100 nm), is compatible with CMOS, SOI and Bipolar processing, has a specific heat comparable to metals, and may have a film impedance compatible with readout circuitry requirements. Table 2 compares the important parameters of an IR microbolometer between vanadium dioxide and a CNT fabric that Nantero would employ.

| Key Microbolometer Parameters | Vanadium Oxide | Carbon Nanotubes | Reasons for CNT advantage |
|---|---|---|---|
| Responsivity/Signal to noise ratio | 500:1 | $\geq$500:1 | |
| NETD @300K 30 Hz f/1 Optics | 20 mK | $\leq$20 mK | Noise levels equiv to VOx could be improved |
| Resolution: Scale as the CMOS processing capability scale | 640 × 480 @25 micron cell size | Same-scalable to 1280 × 960 | Resolution is possible in both technologies |
| TCR | 1-2.5%: −0.023 ($K^{-1}$) | Potential for better positive TCR, anneal out metallic CNT | Single layer CNT films Only semi CNT |
| Thermal response time | 100 mSec | same | |
| Fill Factor | >80% | same | |
| Pixel Operability | >99% | same | |
| Compatibility with CMOS | Yes | same | |
| Spectral response: UV through LWIR | 8-12 microns 80% Absorption | UV through 12 Microns, maybe beyond- MWIR/LWIR possible 80% absorption with cavity reflecting layer | Absorption coefficient $10^4$ to $10^5$ $cm^{-1}$ Ability to functionalize |

FIG. 10 shows another embodiment of this invention (structure 1000), where nanotube detecting fabric 1030 is not supported by mechanical support structure 840 as seen in FIG. 8A. For this design, nanotube fabric 1030 is suspended over cavity 1050, which is coated with reflective layer 1060.

EM detecting nanotube fabric 1030 contacts electrodes 1020 and 1020', which is embedded into insulating substrate 1010. The suspending of a CNT fabric is this manner has been described in previous patents incorporated within and will not be discussed further here.

One aspect of this design is that no IR transmitting highly doped silicon nitride or UV transmitting ZnO layer is required for structural support, thermal conduction and electrical conduction.

Another aspect of this design is that metal electrodes 1020 and 1020' consist of a metal that has similar thermal conductivity as silicon nitride (30 W/m–K) or ZnO (130 W/m–K). As a replacement for silicon nitride, titanium (31 W/m–K) is an ideal metal for electrical contact to the suspended EM detecting nanotube fabric. To replace ZnO for UV detection, Co (100 W/m–K) may be a suitable metal contact for the suspended EM detecting nanotube fabric. Both Ti and Co also make good electrical contact to nanotube fabrics. Other conductors may also be employed which may appropriate thermal and electrical contact to the suspended EM detecting nanotube fabric. A multi-layered metallization scheme may also be employed where electrodes 1020 and 1020' consists of a Ti layer to make contact to the EM detecting nanotube fabric and the Ti is connected to a lower resistivity metal such as Al or Cu to make contact to the underlying interconnects, transistors, sensing circuitry, et cetera.

Figure 10A:
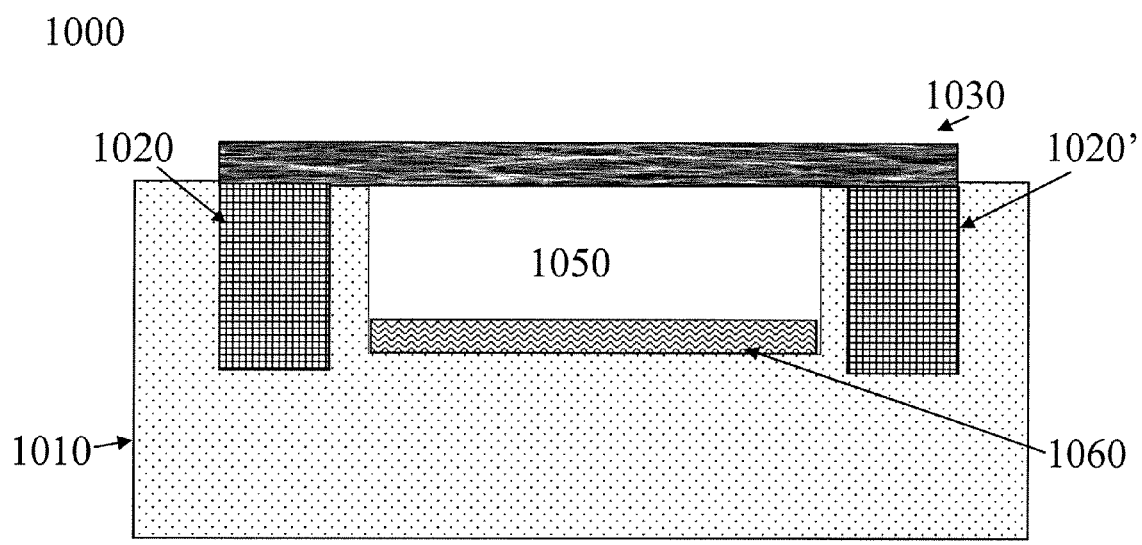
FIGS. 10A and 10B show alternative CNT microbolometer designs that eliminate some of the VOx structures.
Figure 10B:
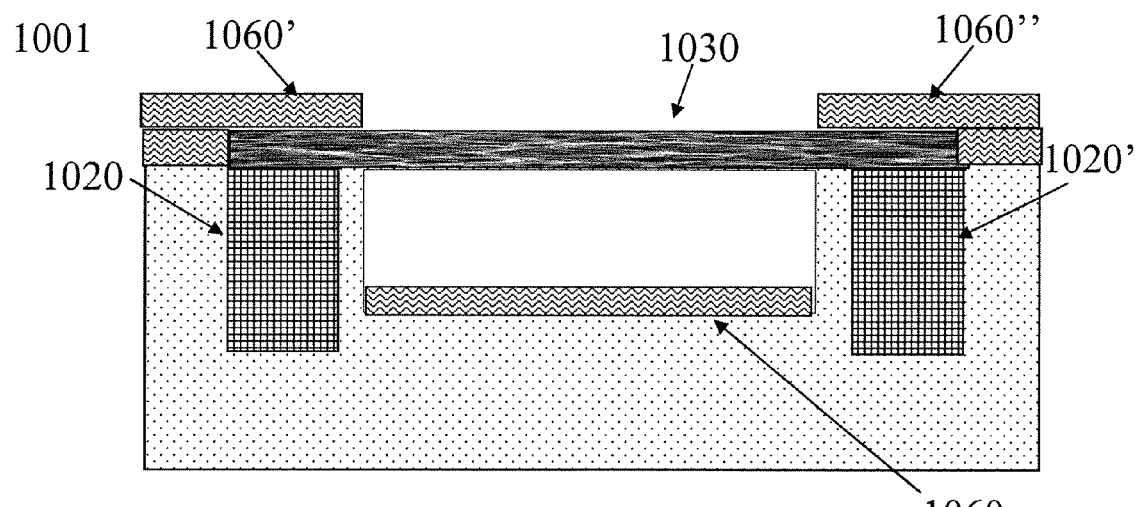

FIG. 10B shows another variation 1001 of an unsupported EM detecting nanotube. For this design, EM detecting nanotube fabric 1030 is coated in either IR reflecting or IR transmitting layer 1060' and 1060" and electrical contacts 1020 and 1020'. Note that for UV detection, the coating layer 1060' and 1060" would consist of appropriate materials. For this example only IR will be discussed. If IR transmission to the electrodes is desired, then silicon nitride can be deposited and patterned over the CNT-metal contact area. This silicon nitride layer does not need to be highly doped for electrical conduction. If IR reflection is desired to prevent heating of the contacts 1020 and 1020' then a reflective layer, such as but not limited to Cu, can be deposited and patterned. In most applications, layers 1060' and 1060" are IR reflecting materials such as Cu, which is also used for the reflector 1060 at the bottom of the cavity 1050.

Figure 11A:
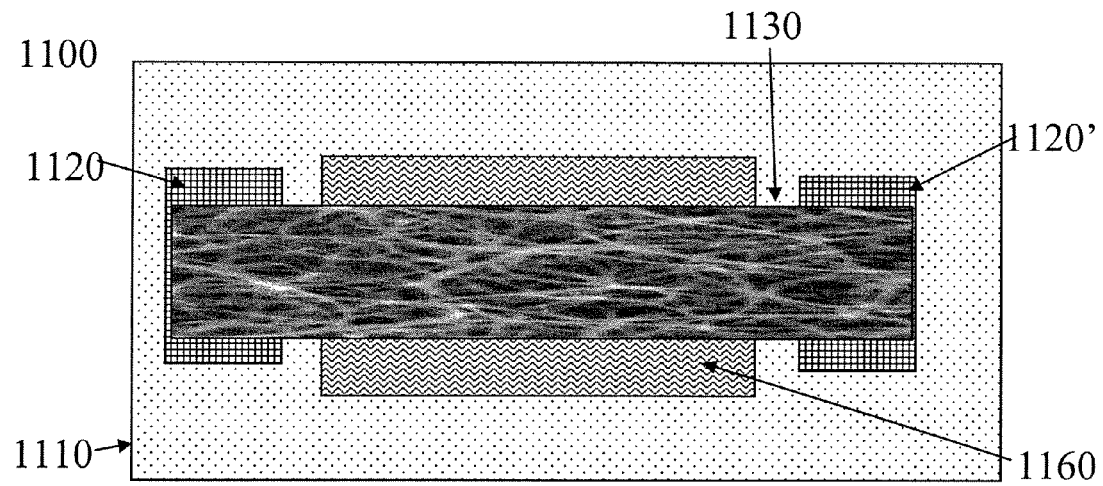
FIGS. 11A and 11B show planar views of some alternative CNT microbolometer structures.
Figure 11B:
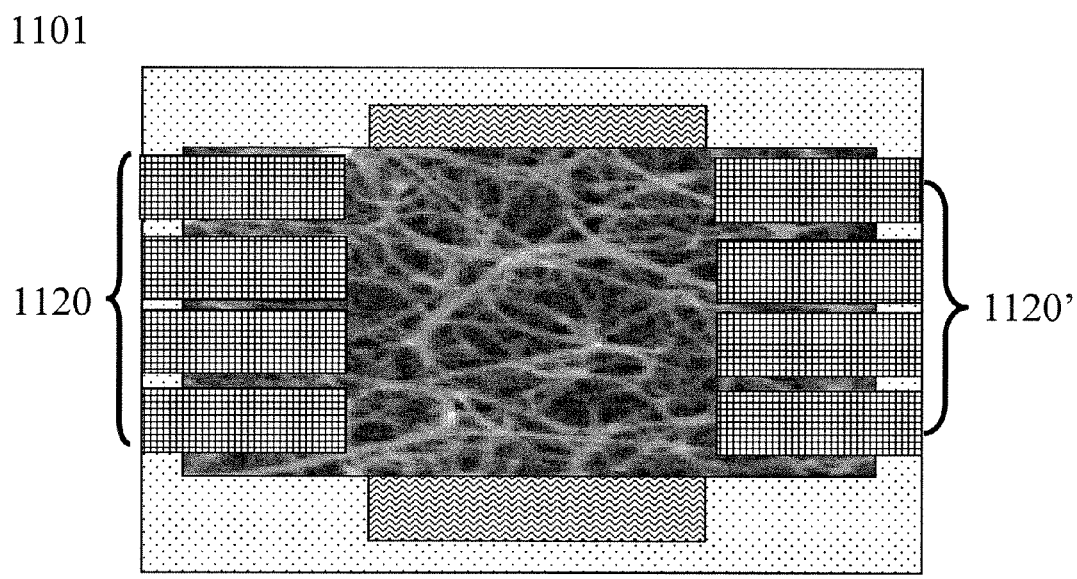

FIG. 11A shows a top view 1100 of structure 1000 shown in FIG. 10A. FIG. 11B shows another top view structure 1100 related to structure 1000 of FIG. 10A where metal contacts 1120 and 1120' are arrayed so that the exposed metal array is reduced, limiting any possible heating of the metal during exposure, which would contribute to background noise.

Figure 12:
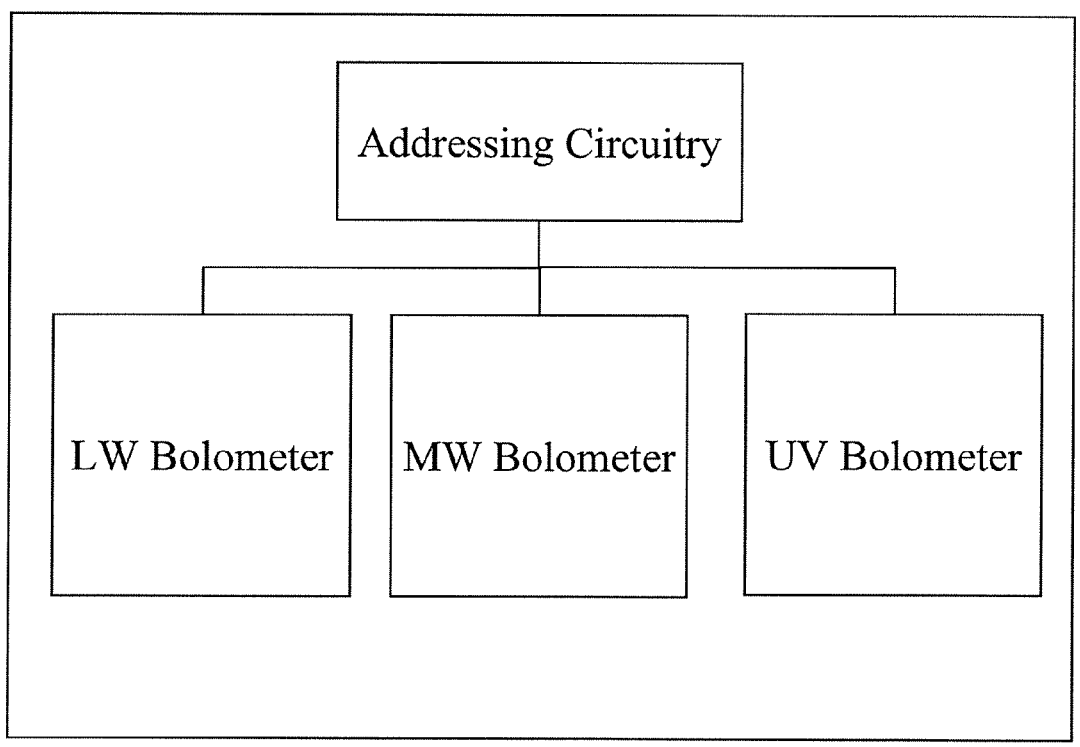
FIG. 12 shows the layout of a sensing array that uses CNT fabrics to detect IR and UV radiation.

A major advantage of EM detecting nanotube fabrics is that multi-colored detectors can be fabricated on the same wafer. FIG. 12 shows a block diagram of a possible layout for a multi-bandwidth detector that has areas of the substrate dedicated for LWIR detection, while a second area focuses on MWIR detection and yet a third area is tailored for UV detection. The ability to fabricate a multi-colored detector array can be accomplished either through the tailoring of the integration process, i.e. such as using either silicon nitride or ZnO with the appropriate reflecting coatings or by functionalizing the nanotubes to absorb at different regions of the EM spectrum, as detailed above. With minimum feature sizes of <250 nm and the CMOS compatibility, the inventors envision MBit arrays of EM detecting nanotube fabrics that cover the range of UV to IR.

In yet another application, EM detecting nanofabrics can also be used as opto-isolators. Such an opto-isolator is useful in relay-type applications for isolating input to output.

Figure 13A:
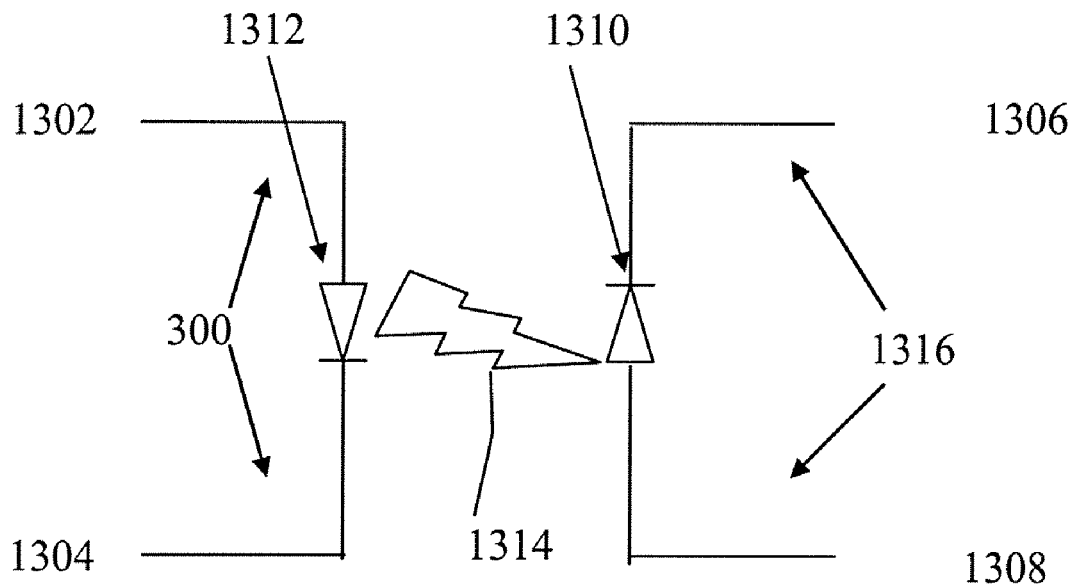
FIG. 13A illustrates an opto-isolator.

FIG. 13A illustrates an LED and photodiode. The LED electrical input electrodes 1302 and 1304 activate electrical input 1300 of LED 1312 sending a current through LED 1312. LED 1312 then generates an EM output signal 1314. LED optical output signal 1314 impinges on photodetector 1310 and photodetector 1310 generates output 1316 as a voltage between output electrodes 1306 and 1308

Figure 13B:
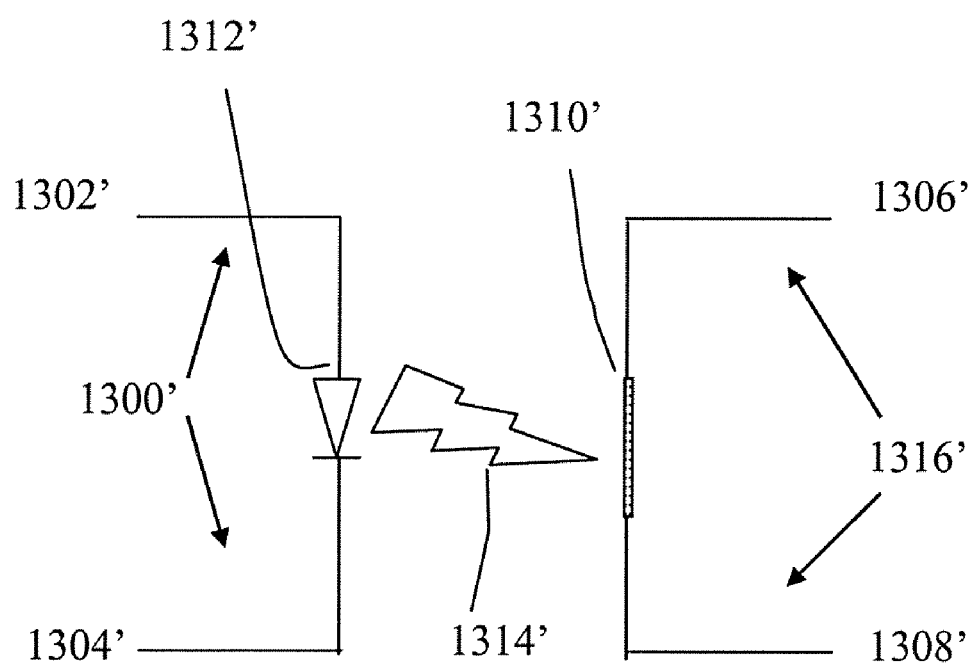
FIG. 13B illustrates a carbon nanotube opto-isolator according to one embodiment.

FIG. 13B illustrates an opto-isolator according to one aspect of the invention where an EM detecting fabric is used as the photodetector. The LED electrical input electrodes 1302' and 1304' activate electrical input 1300' of LED element 1312' sending a current through LED element 1312'. The spectrum of the EM output contains wavelengths in the infrared, visible, and ultraviolet regions of the spectrum, depending on the properties of the LED—i.e. the semiconductor material used for the LED. In an optical isolator application illustrated in FIG. 13B, LED element 1312' EM output 1314' impinges on a surface of a EM nanofabric detector 1310'. The nanofabric detector is attached to 1306' and 1308'. The EM nanofabric detector operates as a bolometer and generates output signal 1316'; however, the inventors also envision detecting EM energy through the generation of a photocurrent by electron-hole recombination or excitons, or by the generation of phonons that produce heating in electrodes 1306' and 1308' that in turn produces a resistance change.

The nanofabric detectors can also be attached to switching transistors or memory devices to create an optical switch, where the attached circuitry will not operate unless EM radiation is impinging on the nanotube detector fabric, to create a high conductive path for the case of exciton generation or a low conductive path for bolometers. This is more ideally suited for either the photodiode or photo-acoustic detector where current is generated due to the impinging EM energy.

A major advantage of the nanotube nanofabric detector is that an entire wafer may be filled with nanotube detectors and some or all of the detectors may be activated by a connected switch to create an optical switch.

Used in conjunction with nanotube EM emitters, previously described in U.S. application Ser. No. 11/227,468, the entire contents of which are herein incorporated by reference, allows for optical circuits that employ nanotube EM emitting fabrics and nanotube EM sensing fabrics. This has many advantages in that the material used to create the light (nanotube fabric) will have the same optical properties (energy and wavelength) as the detector (nanotube fabric). With current optical technology, although silicon provides a reasonable detector material, silicon does not provide sufficient optical emission; therefore, other materials and techniques are required to generate light of sufficient wavelength that can be detected with silicon detectors. With the ease of fabrication of the nanotube emitters and detectors, nanotube fabrics are a reasonable replacement for current semiconductor emitters and detectors.

Another advantage of the nanotube fabric emitters and detectors is that the same patterned fabric can be used for both an emitter and a detector. Therefore, with proper circuit design, the nanotube fabric can be used to emit EM radiation in one instance and detect EM radiation in another instance, minimizing used surface area on the substrate and minimizing fabrication costs and time.

Nanotube detectors integrate well with silicon and other types of optical integration techniques, such as those used for group III-V and II-VI semiconductor technologies that are CMOS, SOI and Bipolar compatible. Nantero has demonstrated the patterning of nanotube fabrics on the CMOS sensitive p-type GaN material in, for example, U.S. Pat. Appl. No. 60/775,461, the entire contents of which are herein incorporated by reference.

Under one certain embodiment, the EM detecting nanotube article is made with single-walled carbon nanotubes; however, MWNTs or a mix of SWNTs and MWNTs can be used. For electron-hole recombination or exciton generation, semiconducting nanotube species are certain. For heat generation or phonon generation both metal and semiconducting nanotubes may be used. Typical EM detecting nanotube fabric articles have a width of 50 nm up to several microns and thicknesses of <1 nm and >>10 nm. For embodiments that suspend a nanotube article, a typical suspension length is 50 nm up to 1 micron.

The type of drive circuitry will be application dependent. The circuitry may be selected to ensure that sufficient voltage is provided to detect EM energy of an intensity and duration desired in a particular context.

Figure 14A:
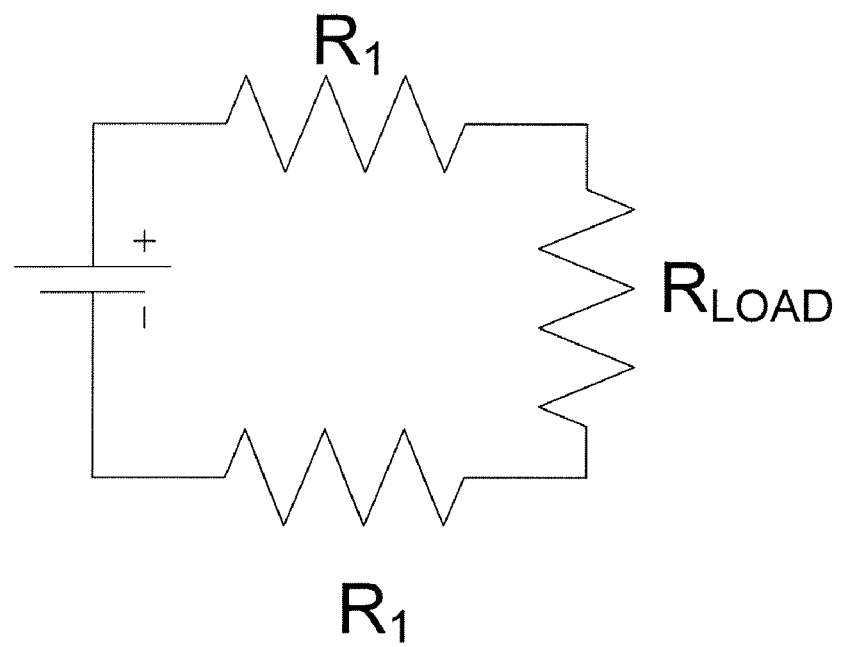
FIG. 14A shows a simple circuit diagram of a temperature sensing circuit.
Figure 14B:
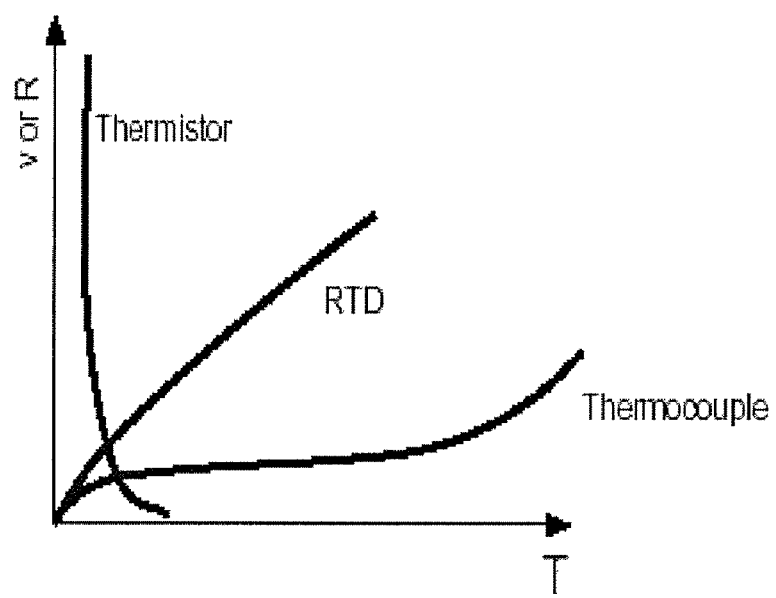
FIG. 14B shows a graphical representation of the resistance and temperature ranges of thermistors and RTDs.

As mentioned above, another type of detector that CNTs, specifically CNT fabrics, can be used for are as thermal detectors, which is similar to bolometers. In fact, thermistor technology can be employed to make bolometers and pyroelectric detectors. A circuit schematic of a simple conventional thermistor is given in FIG. 14A. $R_1$ is the resistance of interconnect lines, while $R_{Load}$ is the resistance of the thermistor. $R_1$ is a known resistance value and $R_{Load}$ has a variable resistance with a known value at room temperature. To lower the parasitic noise in these devices, the thermistor material can be connected to a 4-terminal device or a bridge circuit. The same analysis can be applied to RTD technology. FIG. 14B shows a graphical plot of the expected resistance and temperature ranges for thermistors and RTD devices.

This embodiment discloses a route for nano-sized thermistors and RTDs structures that are based on CNT technology that may be used for discrete temperature sensing in a wide range of electronic and nanoelectronic applications.

Figure 15A:
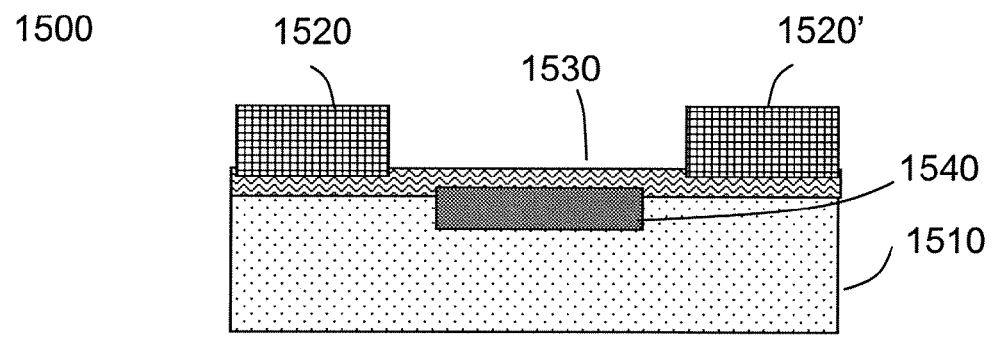
FIG. 15A displays a simple design of a CNT thermistor or RTD device.

FIG. 15A shows a design of a CNT thermistor (or RTD). The fabrication of such a thermistor is similar to the bolometer described above and has been described in references incorporated within. Structure 1500 shows the insulating substrate, which can be formed by an insulator material such as, but not limited to $SiO_2$ and any silica based derivative, alumina, sapphire, Mylar, plastics and other flexible substrates.

Located on or within substrate 1510 of structure 1500 is an area 1540, which is the location on the substrate where a temperature needs to be measured. Area 1540 may be a resistor or conductor (such as a metal interconnect line in an integrated circuit), semiconductor (such as the transistor in CMOS Logic) or insulator (such as the gate oxide or interlayer dielectrics in a SRAM memory device) and structure 1540 may increase or decrease in temperature.

In physical contact with thermally active area 1540 is thermally detecting nanotube fabric 1530. Ideally, semiconducting nanotubes or a semiconducting fabric should be employed for the CNT thermistor, giving a negative TCR for the CNT fabric. Several methods exist and are known in the art for the separation of metallic nanotubes from semiconducting nanotubes, such as those detailed in U.S. patent application Ser. Nos. 10/341,005 and 10/341,130. The separation of the metallic nanotubes from semiconducting nanotubes may be performed before the creation of an electronic grade CNT solution (see U.S. patent application Ser. No. 10/341, 130) or after the fabric has been patterned and the device has been fabricated by gating the semiconducting nanotubes OFF and then passing current through the metallic nanotubes in air, burning the metallic nanotubes. This process has been previously described in U.S. patent application Ser. No. 10/341, 130 and will not be discussed further.

Although in physical contact with 1540, thermally sensing fabric 1530 is electrical isolated from 1540; therefore, if 1540 is an electrical conductor, than an insulating layer (not shown) such as a thin silicon oxide or silicon nitride can be deposited in between thermally active region 1540 and thermally sensing fabric 1530. Ideally, such insulating layer should have a high thermal conductivity so that the heat can be transported to the thermally sensing nanotube fabric.

The thermally detecting nanotube fabric is connected to metal electrodes 1520 and 1520'. These metal electrodes connect to appropriate sensing circuitry. Metal interconnects 1520 and 1520' are conductors such as, but not limited to, Ru, Ti, Cr, Al, Au, Pd, Ni, W, Cu, Mo, Ag, In, Ir, Pb, Sn, as well as other suitable metals, and metal alloys such as TiAu, TiCu, TiPd, PbIn, and TiW, or conductive nitrides, oxides, or silicides such as RuN, RuO, TiN, TaN, $CoSi_x$ and $TiSi_x$. For semiconducting nanotubes, Pd and Ti are ideal contact metals because of the matching of the metal's work function to the vacuum energy of the CNTs, giving a nearly ohmic contact.

Figure 15B:
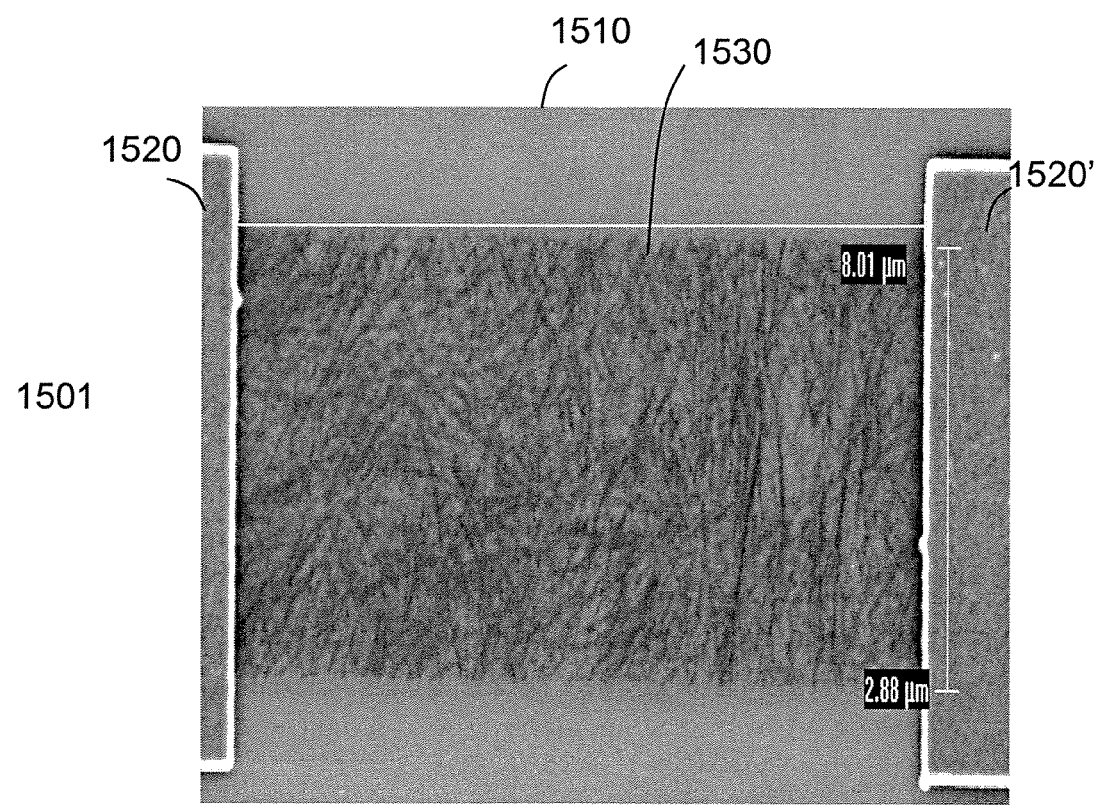
FIG. 15B is a FESEM image of a patterned CNT fabric that is interconnected with metal lines, which can be used as a CNT temperature sensor.

Structure 1501 of FIG. 15B shows an FESEM image of the representative structure that was fabricated in FIG. 15A. FIG. 15BE shows substrate 1510 with patterned nanotube fabric 21530 and metal contacts 1520 and 1520'. Thermally active area 1530 from FIG. 15A would be deposed underneath or on top of CNT fabric 1530.

Another advantage of the CNT thermistor (and another embodiment) is that the temperature detector is completely CMOS compatible, allowing for the fabrication of an on-chip temperature sensor, which can be used as a lab-on-a-chip.

Another embodiment of this invention and similar to the nanotube EM detecting fabric is that the resistance of the CNT-thermistor can also be tailored from several hundred Ohms up to several Mega-Ohms. The CNT fabric used for the thermistor can also be doped and functionalized to tailor the thermal and electrical properties of the fabric, specifically the TCR value of the nanotube fabric to adjust the detection range and temperatures.

Figure 16A:
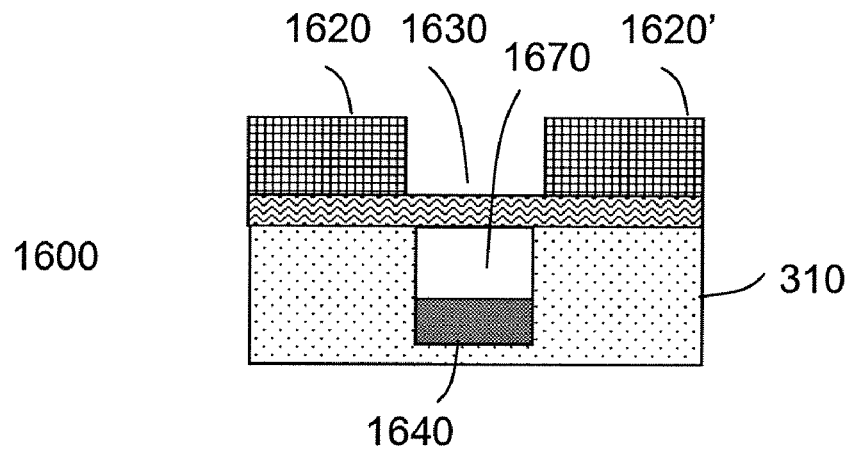
FIG. 16A is a cross-section of a suspended CNT thermistor.

Similar to the EM detectors, another embodiment of the thermal nanotube sensor is that the fabric can be suspended. Although proper thermal contact between the detector and a temperature modulated material is usually required for the detection of temperature changes in the system, one embodiment of this invention uses a suspended thermally detecting nanotube fabric as the thermistor, FIG. 16A. Structure 1600 shows a similar thermistor design as FIG. 15A with substrate 1610, temperature gradient source 1640, nanotube thermistor fabric 1630 and metal interconnects 31620 and 1620'. However, different from the design presented in FIG. 15A, structure 1600 has a gap region 1670 that separates nanotube fabric 1630 from the area where the temperature needs to be measured 1640. The gap region 1670 may have a height of 1 nm up to several hundred nanometers and a length (width) of 10-10,000 nm.

An advantage of a suspended CNT thermistor is that all of the heat (or temperature change) from the source is directed into the nanotube fabric and there is no loss of heat to the surrounding substrate. Another advantage is that there is no electrical contact between the suspended nanotube thermistor fabric 15300 and the heat source 1640. This is important if the heat source is either a metallic interconnect or the active region of a CMOS transistor were the nanotubes may allow for a considerable amount of electrical leakage.

Figure 16B:
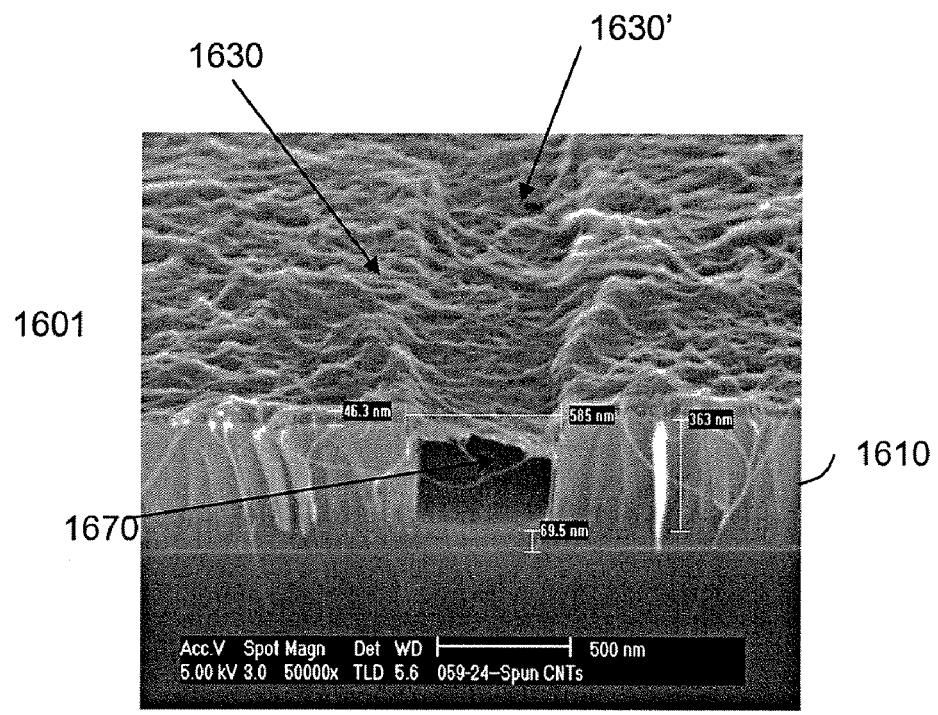
FIG. 16B shows an FESEM image of a suspended CNT fabric that would be used as a suspended CNT temperature sensor.

FIG. 16B shows FESEM image 1601 that has a nanotube fabric 1630 with a suspended nanotube fabric region 1630' over a trench 1670.

Figure 17:
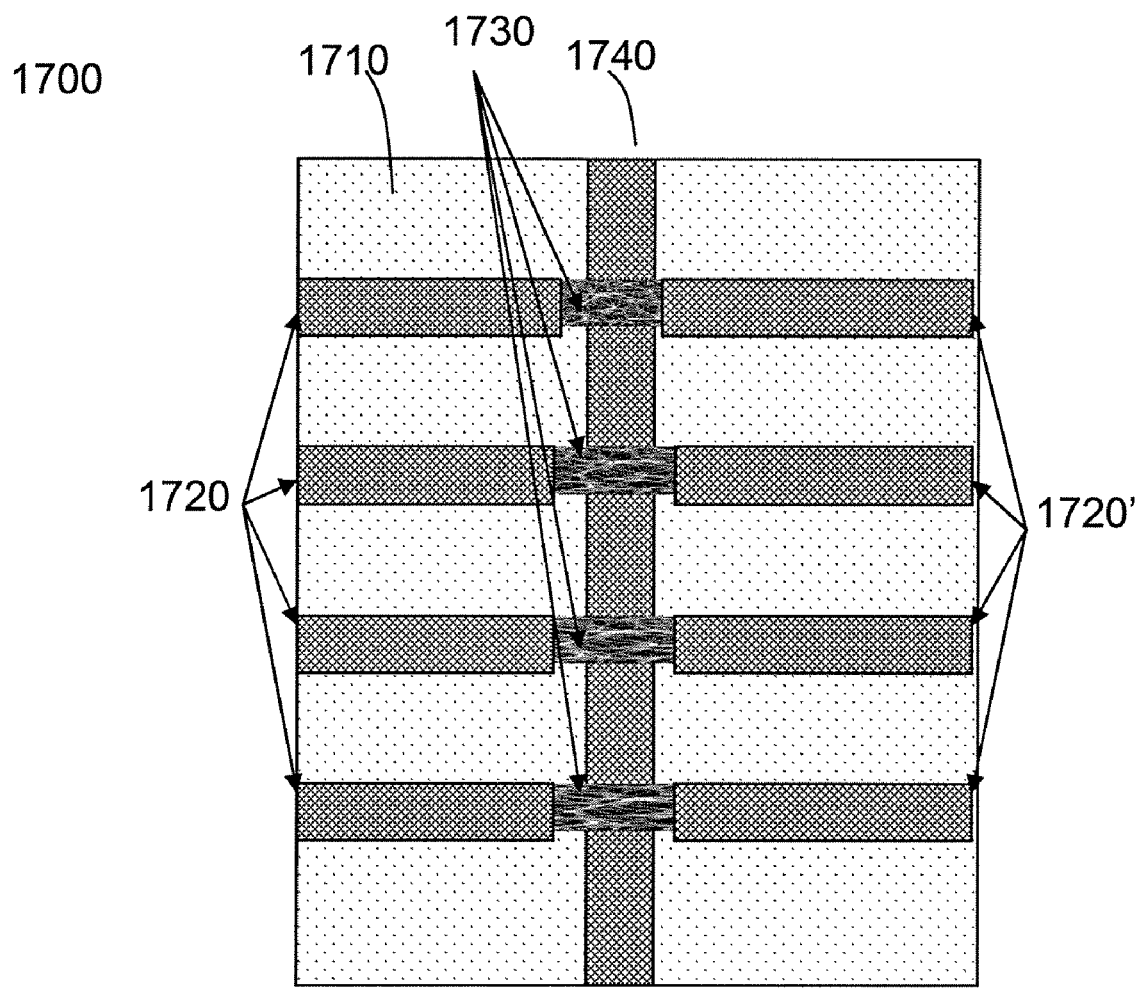
FIG. 17 gives a representation of an array of CNT thermistor or RTD devices that would be used for various sensing applications.

FIG. 17 shows structure 1700, which represents an array of thermistors over a temperature source 1740 which is on substrate 1710. In FIG. 17, thermal sensing nanotube fabric 1730 is patterned into an array structure. The nanotube thermistors are interconnected by metal lines 1720 and 1720'. The nanotube patterns may have the same dimensions (i.e. length and width). For a structure with an array of similar CNT thermistors over a heat source, the CNT thermistors can by employed to measure of the temperature of the source changes along the length of the source. As an example, the thermistors would be placed at separate locations along an interconnect line typically used for ICs. The CNT thermistors would then be used to measure the variation in temperature of the interconnect line as current flows through the interconnect line and causes heating in the interconnect line by Joule heating. Using an array of CNT thermistors also gives redundancy to the CNT thermistor measurements, improving reliability.

It can also be envisioned that the CNT thermistors may have varying lengths and widths within the array (not shown). For a structure that has varying CNT dimensions, the reference resistance of the CNT thermistor will be varied with increasing resistance as patterned CNT length increases and patterned CNT width decreases.

As with the EM detecting nanotube devices, the thermal detecting nanotube devices may also be disposed in a vertical orientation, as described in U.S. Pat. No. 6,924,538.

In yet another embodiment of this invention, the CNT fabric consists primarily of metallic nanotubes and is metallic in nature, meaning that as the temperature increases the resistance of the fabric increases. This type of metallic nanotube fabric allows for the creation of a CNT-RTD device. The fabrication of the CNT-RTD device is the same as the thermistor device shown in FIG. 15. Unlike the thermistor, the RTD devices have a positive coefficient of resistance (PTC). The advantage of a CNT RTD is that the CNT RTD should be able to handle a much larger temperature range compared to Pt (range −200° C.-600° C.) due to the much higher melting point of carbon nanotubes (>3000° C.) compared to all metals.

In a related embodiment, both a semiconducting CNT thermistor type fabric and a metallic CNT RTD type fabric are used in conjunction on the same device to give a wide range for the temperature detection. Since the semiconducting CNTs possess a relatively small band gap, the thermistors are more ideally suited for low temperature detection, while the metallic nanotubes can handle very high temperature detection because of the nanotubes high melting temperature.

Several possible applications for CNT thermistors can be envisioned. The first application for a CNT thermistor is for on-chip temperature sensing and control for CMOS and SOI integrated circuits. Because the CNT thermistor is readily fabricated and electrically connected with CMOS integration techniques, it is possible to deposit, pattern and interconnect the CNT thermistors at any device level to measure the temperature of the active region at that level and then control the input parameters of the active area to control the amount of heating or cooling in the active device.

In another application, the CNT thermistor, which has a negative TCR, can be employed in conjunction with a metal resistor or interconnect to cancel out the positive temperature coefficient of the metal line. An advantage with the CNT thermistor is that the properties of the CNT fabric can be tailored to match the properties of the metal interconnect so that the decrease in resistance of the nanotube fabric can closely match the increase in resistance of the metal line; therefore, giving a near zero change in resistance of the entire system.

Another possible application involves using the CNT thermistor as a thermal relay and switch. This type of device is useful for power supply circuits, where the CNT fabric has a high resistance initially, preventing the flow of large currents when the device is turned to the ON state. Then as the system heats up and the resistance of the CNT thermistor decreases current is allowed to pass through the CNT thermistor, permitting for normal circuit operation.

Besides IC circuits and electronics, the CNT thermistors can also be utilized for monitoring the rate of change in temperature and other parameters of the surroundings, such as liquid levels, fluid flow and vacuum level. This is not possible with standard thermal detectors, because the detector material may be reactive to the liquid matrix, whereas, the CNT fabric may be derivatized to alter its properties, especially sensitivity to liquids and/or hydrophobicity or hydrophilicity. These properties are more fully described U.S. Patent Publication Nos. 2005/0053525 and 2005/0065741.

In yet another aspect of this invention, a nanotube detecting fabric can be used in as a replacement for liquid electrolytes for dye-sensitized solar cells. Current dye-sensitized solar cells use dye-sensitized $TiO_2$ or other semiconducting nanoparticles mixed with a liquid electrolyte or an organic material to produce a photovoltaic signal (see Gratze, M "Photoelectrochemical cells", Nature 414 (2001) 338-344 and U. Bach, et al, "Solid-state dye-sensitized mesoporous $TiO_2$ solar cells with high photon-to-electron conversion efficiencies", Nature 395 (1998) 583-585). This invention is related to detectors because EM radiation such as light energy from the sun is detected with the solar cell and then converted into usable energy for various applications.

Figure 18A:
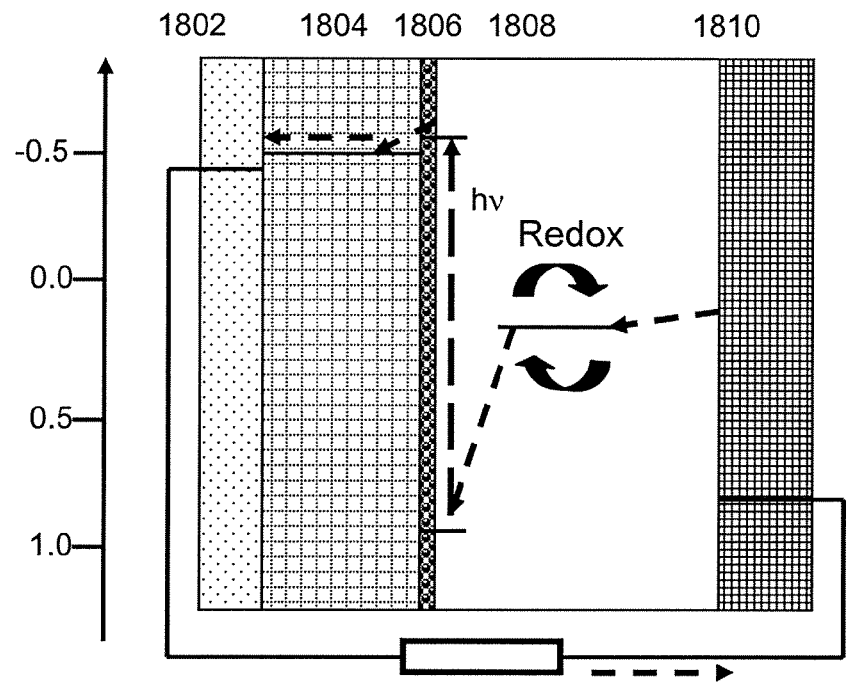
FIG. 18A shows a dye-sensitive photovoltaic cell

FIG. 18A shows an energy band schematic of a dye-sensitized electrolytic solar cell. The energy band schematic comprises anode (1802), $TiO_2$ (1804), dye-sensitive material (1806), electrolyte (1808), and cathode (1810). Solar energy (h□) interacts with the dye-sensitive material (1806), causing the excitation of an electron, which in turn transfers to the conduction band (low energy state) in the $TiO_2$ nanoparticle. The electrons move through the nanoparticle network to a conducting anode (1802). The dye-sensitive material (1806) is now at an oxidized state with a positive charge. A liquid electrolyte (1808) or an organic polymer phase acts as the hole transport medium and serves to regenerate missing electrons in the dye and transport positive charges to the cathode (1810). For liquid electrolytes (1808), the electron arises by a redox reaction, creating an electron for the dye and a hole for the cathode (1810); while, in organic-inorganic bulk heterojunction solar cells an inorganic p-type semiconductor material or an organic charge transport material serves as hole conductors, replacing the electrolyte medium.

Charge transport in hybrid organic-inorganic solar cells is limited by percolation due to low connectivity networks. This prevents the charge carriers from reaching the electrodes before they can recombine and decrease the power conversion efficiency. To overcome these issues, highly conducting percolating networks and films can be fabricated with carbon nanotube fabrics; therefore, the use of carbon nanotube networks in place of organic/polymeric phases can overcome the percolation limited charge transport in hybrid organic-inorganic solar cells.

Figure 18B:
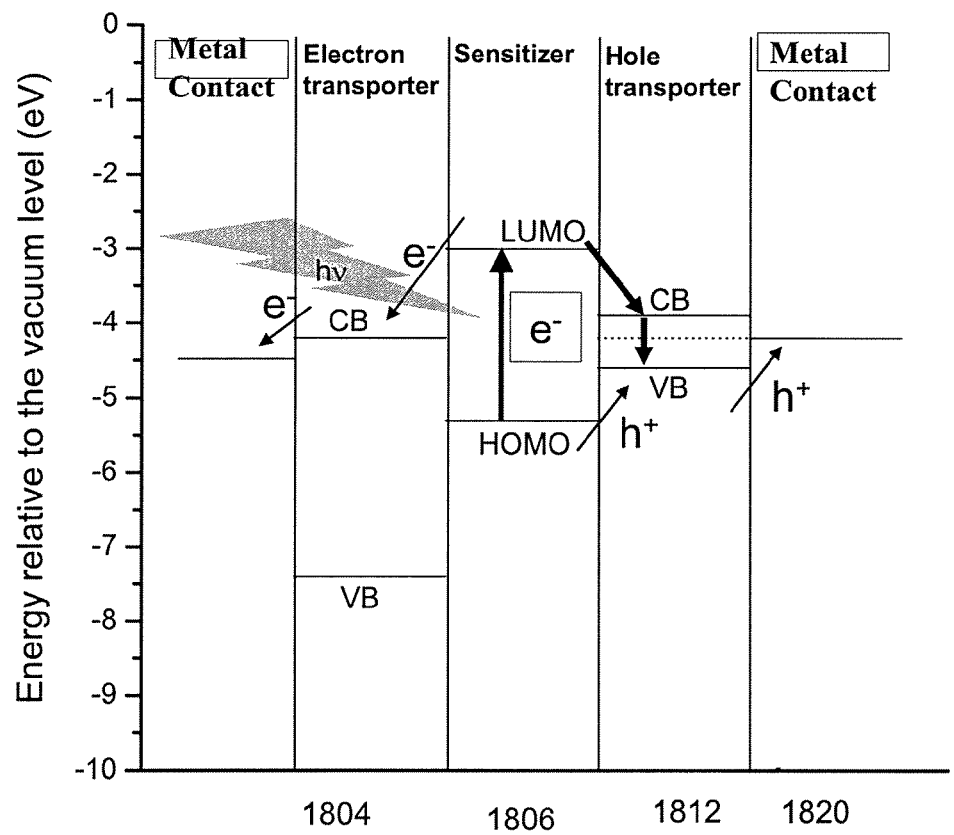
FIG. 18B shows dye-sensitive photovoltaic cell band diagram with carbon nanotubes as hole transport medium.

Due to the unique electrical properties of semiconducting carbon nanotube, the inventors envision using carbon nanotube fabrics as a hole transport medium, replacing current electrolytic and inorganic and organic hole transporters. Carbon nanotubes have a work function of order of 4.5 to 5 eV which is similar to the work function of most of the organic/polymeric materials used in hybrid organic-inorganic solar cells. Therefore, energy level matching of CNTs with the right kind of dye sensitizer or semiconductor nanocrystal can be achieved. FIG. 18B shows an expected band profile of a dye sensitized solar cell with a SWNT fabric (1812) as the hole transport medium. The bands match very well for efficient hole ($h^+$) injection from the sensitizer to the nanotube network and subsequent transport through the nanotube network to the contact. Networks or films of single-walled, double-walled or multi-walled carbon nanotubes can be used (1812). The valence band edge may vary from 4.5-5.0 eV, depending on the type of nanotubes used. The dye used can be a Ru based dye, which is used in standard dye-sensitiized solar cell.

Carbon nanotubes have an advantage over other mediums in that nanotube networks and films have hole mobilities of 1 $cm^2/Vs$, which is several orders of magnitude higher than hole mobility of most of the organic or polymeric hole transport medium used in dye-sensitized and bulk hetero-junction solar cells (typical hole mobility is in the range of $1 \times 10^{-1}$ to $1 \times 10^{-3} cm^2/Vs$). Incorporating nanofabrics as the hole transport layer should lead to faster charge transport and higher efficiency solar cells. In addition to their high hole mobility, nanotube networks can be fabricated in the form of highly conducting films and fabrics due to their high aspect ratio and high intrinsic conductivity. Therefore, slow charge transport due to non-percolating networks that is common in organic-inorganic hybrid solar cells can be overcome by incorporating nanotube network as one of the charge transport phases.

Therefore, yet another embodiment uses the nanotube fabric as a photovoltaic solar cell in conjunction with dye-sensitized nanoparticles. Although the nanotube fabric is not acting as a detecting medium, the entire device is used to detect and convert energy into power. Nanotube films and networks may be used as a medium for hole (or positive charge) transport in dye-sensitized solar cells.

For the nanotube network to operate as a sufficient hole transporter, the correct contact metal to the nanotube fabric is required. Studies such as those done by Z. Chen, et al ("The role of metal-nanotube contact in the performance of carbon nanotube transistors", Nano Letters, 5(7) (2005) 1497-1502) have shown that most metals form a Schottky barrier contact with p-type characteristics to semiconducting nanotubes, meaning that the contacts inject holes into the semiconducting nanotubes. However, Y. Nosho, et al ("n-type carbon nanotube field-effect transistors fabricated by using Ca contact electrodes", Applied Physics Letters, 86 (2005) 073105-1-073105-3) have demonstrated how to make n-type nanotube conductors where holes are injected into the Ca contacts and electrons into the semiconducting nanotube. It is also possible to use other types of alkaline metals that will form a desired nanotube-metal n-type contact. Recent work has also shown that Al metal (a CMOS compatible metal) also forms an n-type contact (1820) to a nanotube fabric by forming a positive Schottky barrier between the semiconducting nanotubes and the Al metal. Using a p-type connection on one end of the nanotubes (hole injection from dye into nanotube fabric) and n-type connection on the other end of the nanotube fabric (electron injection from Ca or Al contact into nanotube fabric) allows for the realization of using the nanotube fabric as a hole transport medium in dye-sensitized solar cells.

Figure 18C:
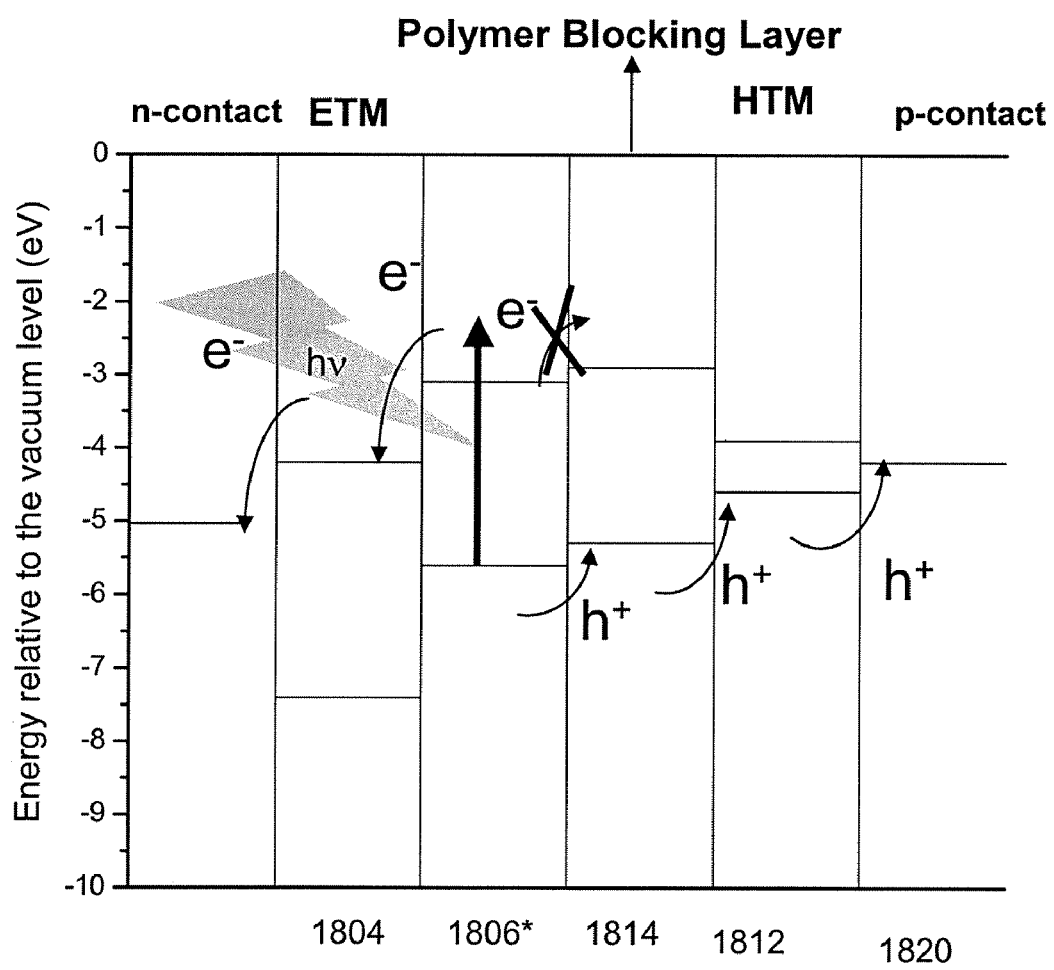
FIG. 18C shows a band diagram of a dye-sensitive photovoltaic cell with a polymer blocking layer.

Possible electron (e-) transfer from the lowest unoccupied molecular orbital (LUMO) of the dye to the conduction band (CB) of the nanotubes can be avoided by using a polymeric interface that will block electron transfer but allow hole transfer to the nanotube network. FIG. 18C shows the band profile a dye sensitized solar cell with nanotubes as the hole transport layer and a polymeric interlayer to block possible electron transfer from the dye molecule to the nanotubes. Poly-3-octyl thiophene (P3OT) or other polymers (1814) with an appropriately matched energy level with respect to the dye and the nanotubes (e.g. single-walled nanotubes) (1812) can be used as the blocking layer. In this particular example, the dye used is N-(1-pyrenyl)maleimide dye for better energy level matching with the P3OT (1814) blocking layer.

Homogeneous nano-scale mixing of the CNT and the nanoparticle phases can be achieved by using nanotube networks and films functionalized with the desired inorganic nanoparticles as described above.

Nano-scale mixing of the phases can also be achieved through layer-by-layer deposition of alternating nanotube and nanoparticle networks. Layer-by-layer deposition can be done by coating alternate layers of carbon nanotube and nanoparticles. Dispersions of commercially available $TiO_2$ nanoparticles (1804) can be used to apply the nanoparticle layer. The layers/films can be applied either by spin or spray coating as described in incorporated references.

Figure 19:
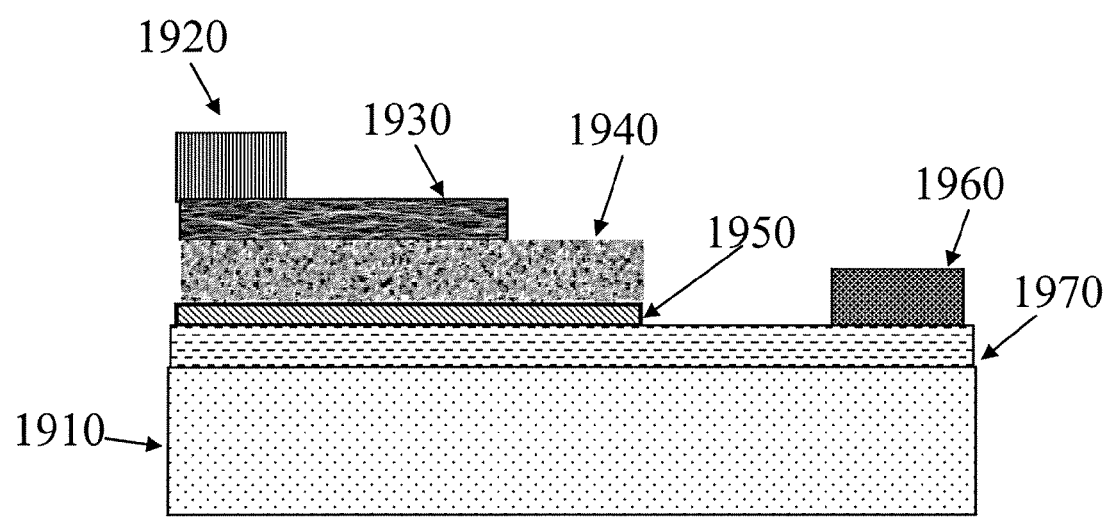
FIG. 19 shows a possible design of a dye-sensitive photovoltaic cell with a CNT conducting matrix.

FIG. 19 shows a schematic of a solar cell structure 1900 made from carbon nanotubes, $TiO_2$, and dye molecules. The cell comprises of a insulating substrate 1910 coated with a fluorinated tin oxide (SnO:F) or indium tin oxide (ITO) layer 1970. The SnO:F or the ITO layer forms a transparent bottom electrode through which the light strikes the active layer. Above the transparent bottom electrode is a smooth $TiO_2$ film 1950 which supports the nanoparticles and prevents shorting of the nanotubes in the active layer to the bottom electrode 1960. Above the smooth $TiO_2$ layer is the active layer 1940, which in this particular example is a dye sensitized $TiO_2$ nanoparticle network impregnated on a nanotube network. Above the active layer is a nanotube overlayer 1930, which provides good electrical contact to the top electrode 1920. As mentioned above, the top electrode 1920 is any metal that gives a n-type connection to the nanotube fabric, such as but not limited to Al and Ca.

Figure 20A:
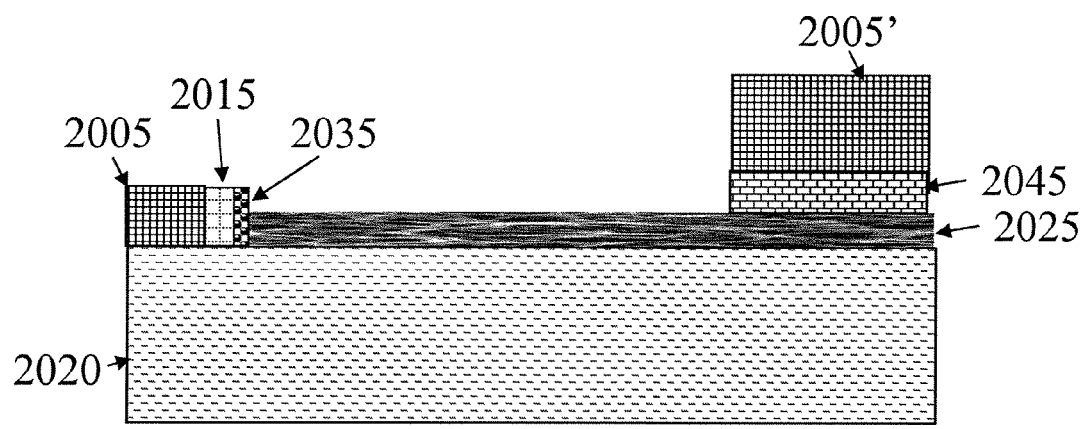
FIGS. 20A and 20B illustrate additional nanotube photovoltaic cell designs.

FIG. 20A shows another possible design for a dye-sensitized photovoltaic cell 2000 with a nanotube fabric hole transport medium 2025 deposed onto insulator 2020. For this design, nanofabric 2025 is contacted on one end with dye material 2035 and semiconducting nanoparticle matrix 2015. The nanoparticle matrix is attached to a conducting electrode 2005. The other end of the nanofabric 2025 is contact to n-type contact metal 2045 which in turn is contact to metal electrode 2005'. Electrodes 2005 and 2005' may be constructed from a wide variety of metals such as, but not limited to Al, Cu, W, Al (<1% Cu), Co, Ti, Ta, W, Ni, Mo, Pd, Pt, TiW, Ru, $CoSi_x$, $WSi_2$, $TiSi_x$, TaN, TiN, TiAlN, RuN, RuO, PtSi, $Pd_2Si$, $MoSi_2$, $NiSi_x$, Ag, Au, Au/Ti, Bi, Ca, Cr, Cr/Au, Fe, In, Ir, Mg, Na, Ni, $NiSi_2$, Os, Pb, Rh, RhSi, Sb, Sn, Pb/Sn, PbIn, Zn and $ZrSi_2$.

In FIG. 20A, light of energy h□ impinges on the dye material 2035, which transfers an electron to the semiconducting nanoparticle matrix 2015 and a hole to nanotube fabric 2025. The electron is then transferred to the conducting electrode 2005, while, the hole is transferred along the nanotube fabric 2025 to contact electrode 2045. The electrodes 2005 and 2005' are connected to corresponding circuitry (not shown) that is used to collect the excess electron energy.

Figure 20B:
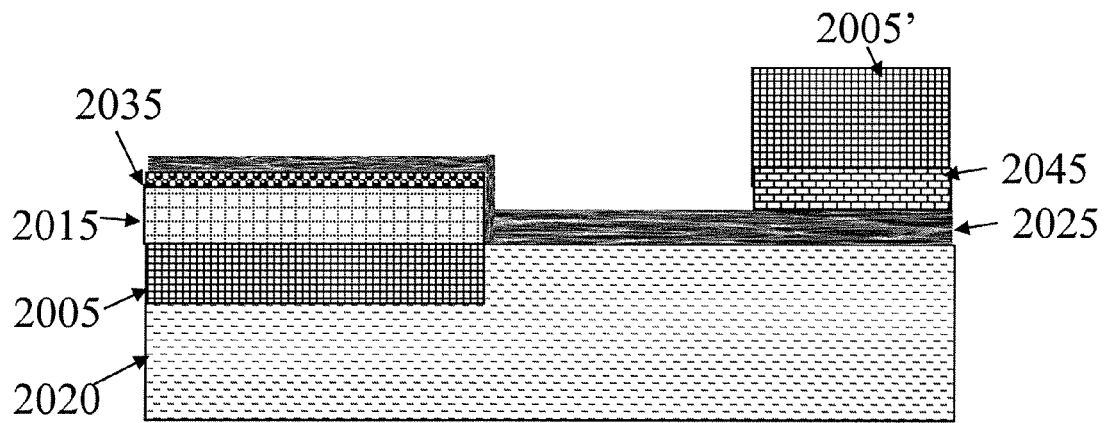

FIG. 20B shows yet another design of the above embodiment where nanotube fabric 2025 is disposed on top of dye material 2035 and nanoparticle material 2015. Since nanofabric 2025 is highly porous, light of energy h□ can freely interact with dye material 2035, with a minimal loss in photon energy to the fabric.

Figure 21:
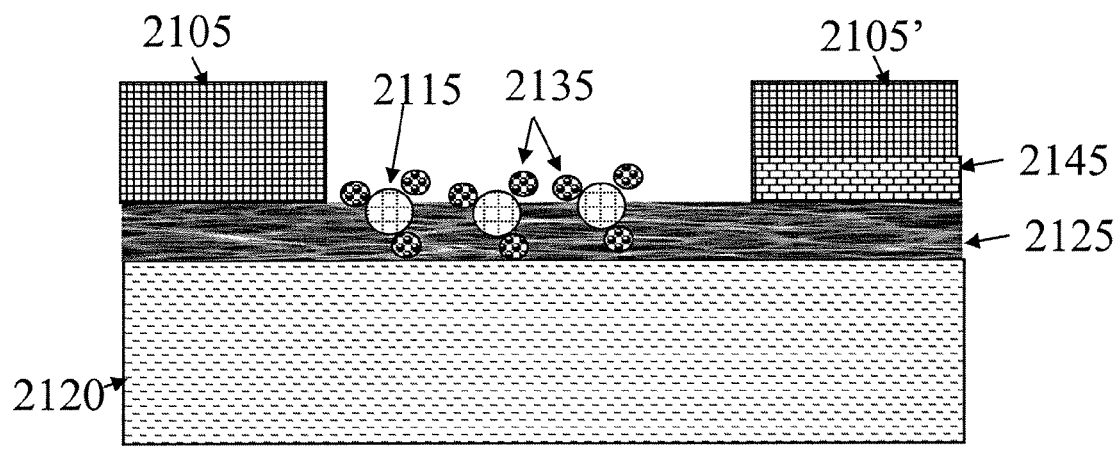
FIG. 21 illustrates a nanotube photovoltaic cell impregnated with nanoparticles.

Another embodiment of this invention is to use nanotubes as the hole transport medium in solar cells where the electron transport medium are nano-crystal semiconductors impregnated within the nanotube fabric. FIG. 21 shows a schematic of this device where nanoparticles 2115 and dye material 2135 is incorporated within fabric 2125.

These nanotube hole transfer mediums may also be constructed from multi-walled and double-walled carbon nanotubes and also may be formed into monolayer of multilayered fabrics as long as the fabric maintains semiconductor characteristics.

In an alternate embodiment of the invention is to use nanowires or nanotubes of $TiO_2$ or $ZnO$ in place of nanoparticles to make dye-sensitized solar cells with carbon nanotubes.

Although the CNT fabric is primarily employed as a charge carrier transport medium, it is also possible for the CNT fabric to also assist in the detection/collection of photon energy by the same detector properties that were described above.

The following patent references refer to various techniques for creating nanotube fabric articles and switches and are assigned to the assignee of this application. Each of the following is hereby incorporated by reference in its entirety:

U.S. patent application Ser. No. 10/341,005, filed on Jan. 13, 2003, entitled Methods of Making Carbon Nanotube Films, Layers, Fabrics, Ribbons, Elements and Articles;

U.S. patent application Ser. No. 09/915,093, now U.S. Pat. No. 6,919,592, filed on Jul. 25, 2001, entitled Electromechanical Memory Array Using Nanotube Ribbons and Method for Making Same;

U.S. patent application Ser. No. 10/033,032, now U.S. Pat. No. 6,784,028, filed on Dec. 28, 2001, entitled Methods of Making Electromechanical Three-Trace Junction Devices;

U.S. patent application Ser. No. 10/033,323, now U.S. Pat. No. 6,911,682, filed on Dec. 28, 2001, entitled Electromechanical Three-Trace Junction Devices;

U.S. patent application Ser. No. 10/128,117, now U.S. Pat. No. 6,835,591, filed on Apr. 23, 2002, entitled Methods of NT Films and Articles;

U.S. patent application Ser. No. 10/844,913, now U.S. Pat. Publ. No. 2005/0053525 filed on May 12, 2004, entitled Horizontally Oriented Sensor Constructed with Nanotube Technology;

U.S. patent application Ser. No. 10/844,883, now U.S. Pat. Publ. No. 2005/0065741, filed on May 12, 2004, entitled Vertically Oriented Sensor Constructed with Nanotube Technology;

U.S. patent application Ser. No. 10/341,055, filed Jan. 13, 2003, entitled Methods of Using Thin Metal Layers to Make Carbon Nanotube Films, Layers, Fabrics, Ribbons, Elements and Articles;

U.S. patent application Ser. No. 10/341,054, filed Jan. 13, 2003, entitled Methods of Using Pre-formed Nanotubes to Make Carbon Nanotube Films, Layers, Fabrics, Ribbons, Elements and Articles;

U.S. patent application Ser. No. 10/341,130, filed Jan. 13, 2003, entitled Carbon Nanotube Films, Layers, Fabrics, Ribbons, Elements and Articles;

U.S. patent application Ser. No. 10/776,059, now U.S. Publication No. 2004/0181630, filed Feb. 11, 2004, entitled Devices Having Horizontally-Disposed Nanofabric Articles and Methods of Making The Same;

U.S. patent application Ser. No. 10/776,572, now U.S. Pat. No. 6,924,538, filed Feb. 11, 2004, entitled Devices Having Vertically-Disposed Nanofabric Articles and Methods of Making the Same;

U.S. patent application Ser. No. 10/128,118, now U.S. Pat. No. 6,706,402, filed Apr. 23, 2002, entitled Nanotube Films and Articles;

U.S. patent application Ser. No. 09/915,173, now U.S. Pat. No. 6,643,165, filed Jul. 25, 2001, entitled Electromechanical Memory Having Cell Selection Circuitry Constructed with Nanotube Technology;

U.S. patent application Ser. No. 09/915,095, now U.S. Pat. No. 6,574,130, filed Jul. 25, 2001, entitled Hybrid Circuit Having Nanotube Electromechanical Memory;

U.S. patent application Ser. No. 10/918,085, now U.S. Pat. No. 6,990,009, filed Aug. 13, 2004, entitled Nanotube Based Switching Elements with Multiple Controls;

U.S. patent application Ser. No. 10/860,432, now U.S. Pat. Publication No. 2005/0269553, filed Jun. 3, 2004, entitled Spincoatable Liquid for Use in Electronic Fabrication Processes;

U.S. patent application Ser. No. 10/860,332, now U.S. Pat. Publication No. 2005/0058797, filed Jun. 3, 2004, entitled High Purity Nanotube Fabrics and Films;

U.S. patent application Ser. No. 10/860,331, filed Jun. 3, 2004, entitled Method of Making an Applicator Liquid for Electronics Fabrication Process;

U.S. patent application Ser. No. 10/844,913, now U.S. Pat. Publication No. 2005/0053525, filed May 12, 2004, entitled Sensor Platform Using a Horizontally Oriented Nanotube Element;

U.S. patent application Ser. No. 11/227,468, filed Sep. 15, 2005, entitled Light Emitters using Nanotubes and Methods of Making Same; and U.S. Provisional Pat. Apl., No. 60/775,461, filed Feb. 21, 2004, entitled Method of Forming Carbon Nanotube Based Contact to Semiconductor.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An electromagnetic radiation detector comprising:
   a substrate;
   a nanotube fabric disposed on the substrate, the nanotube fabric comprising a non-woven network of nanotubes and
   first and second conductive terminals, each in electrical communication with the nanotube fabric, the first and second conductive terminals disposed in space relation to one another;
   wherein the nanotube fabric is tuned and derivitized to be sensitive to a predetermined range of electromagnetic radiation such exposure to the electromagnetic radiation generates a temperature change in the fabric that induces a change in the nanotube fabric resistance between the first and second conductive terminals.

2. The detector of claim 1 wherein the detector further comprises sensing circuitry for detecting the change in resistance, the sensing circuitry integrated with CMOS circuitry.

3. The detector of claim 1 wherein the nanotube fabric is functionalized to be sensitive to the predetermined range of electromagnetic radiation.

4. The detector of claim 1 wherein the substrate comprises a dielectric material.

5. The detector of claim 1 wherein the predetermined range of electromagnetic radiation comprises IR radiation and the active region of the nanotube fabric has a thermal coefficient of resistance between approximately 1% per degree C. and approximately 4% per degree C.

6. The detector of claim 1 wherein the electromagnetic radiation comprises UV radiation.

7. The detector of claim 1 wherein the nanotube fabric comprises one of a multilayer fabric and a monolayer fabric.

8. The detector of claim 1 wherein the nanotube fabric further comprises semiconducting nanoparticles, the nanotube fabric tuned such that exposure to a selected photon energy induces the change in resistance between the first and second conductive terminals.

9. The detector of claim 1 wherein the nanotube fabric comprises dye-sensitized nanoparticles.

10. The detector of claim 1 wherein the nanotube fabric comprises electromagnetic radiation-sensitive nanoparticles including at least one of VOx, amorphous silicon and Ti particles.

11. The detector of claim 1, wherein the predetermined range of electromagnetic radiation comprises thermal radiation and the nanotube fabric is tuned to have a selected thermal coefficient of resistance (TCR).

12. The thermal detector of claim 11, wherein the TCR comprises a positive value.

13. The thermal detector of claim 11, wherein the TCR comprises a negative value.

14. The thermal detector of claim 12, wherein the selected TCR is tuned through one of doping and functionalizing the nanotube fabric.

* * * * *